(12) United States Patent
Fukushima et al.

(10) Patent No.: US 11,662,831 B2
(45) Date of Patent: May 30, 2023

(54) IMAGE DISPLAY APPARATUS AND IMAGE DISPLAY METHOD

(71) Applicant: MAXELL, LTD., Kyoto (JP)

(72) Inventors: Hiromi Fukushima, Tokyo (JP); Yusuke Nakamura, Tokyo (JP); Osamu Kawamae, Kyoto (JP); Manabu Katsuki, Kyoto (JP); Megumi Kurachi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/742,589

(22) Filed: May 12, 2022

(65) Prior Publication Data

US 2022/0283648 A1 Sep. 8, 2022

Related U.S. Application Data

(63) Continuation of application No. 16/963,274, filed as application No. PCT/JP2018/044570 on Dec. 4, 2018, now Pat. No. 11,360,568.

(30) Foreign Application Priority Data

Jan. 22, 2018 (JP) .................................. 2018-007855

(51) Int. Cl.
*G06F 3/01* (2006.01)
*G06T 7/521* (2017.01)
(Continued)

(52) U.S. Cl.
CPC .............. *G06F 3/017* (2013.01); *G06F 3/011* (2013.01); *G06T 7/521* (2017.01); *G06V 10/88* (2022.01);
(Continued)

(58) Field of Classification Search
CPC .......... G06F 3/017; G06F 3/011; G06F 3/012; G06T 7/521; G06T 2207/10028;
(Continued)

(56) References Cited

U.S. PATENT DOCUMENTS 8,890,813 B2 * 11/2014 Minnen ................ G06V 40/107
345/158
9,880,634 B2 * 1/2018 Sugaya ................ G06V 40/103
(Continued)

FOREIGN PATENT DOCUMENTS

JP 2014-518596 A 7/2014
JP 2015-180869 A 10/2015
(Continued)

OTHER PUBLICATIONS

International Search Report of PCT/JP2018/044570 dated Feb. 19, 2019.

*Primary Examiner* — Tom V Sheng
(74) *Attorney, Agent, or Firm* — Mattingly & Malur, PC

(57) ABSTRACT

A modulator of a distance measuring sensor unit 102 has a photographing pattern that includes a plurality of patterns different from each other, and modulates intensity of light. A gesture detecting unit divides image data obtained by receiving light transmitted through the modulator by the image sensor; restores an image by calculation based on a developing pattern corresponding to the photographing pattern in a divided unit; and obtains an image for detecting gesture of a user. This makes it possible to obtain an image of an object in an outside world without using a lens for forming an image. Therefore, it is possible to reduce a load on a user when the user wears the apparatus.

14 Claims, 46 Drawing Sheets

(51) Int. Cl.
  *G09G 3/36* (2006.01)
  *G06V 40/20* (2022.01)
  *H04N 23/56* (2023.01)
  *G06V 10/88* (2022.01)
  *G06V 20/64* (2022.01)
  *G06V 40/10* (2022.01)
  *H04N 23/57* (2023.01)

(52) U.S. Cl.
  CPC ............ *G06V 20/64* (2022.01); *G06V 40/107* (2022.01); *G06V 40/20* (2022.01); *G09G 3/36* (2013.01); *H04N 23/56* (2023.01); *G06F 3/012* (2013.01); *G06T 2207/10028* (2013.01); *G06T 2207/10048* (2013.01); *G06T 2207/10152* (2013.01); *G06T 2207/20021* (2013.01); *G06T 2207/30181* (2013.01); *H04N 23/57* (2023.01)

(58) Field of Classification Search
  CPC . G06T 2207/10048; G06T 2207/10152; G06T 2207/20021; G06T 2207/30181; G06V 20/64; G06V 10/88; G06V 40/20; G06V 40/107; H04N 23/56; H04N 23/57; G09G 3/36
  USPC .......................................... 345/156
  See application file for complete search history.

(56) References Cited

U.S. PATENT DOCUMENTS

| | | | |
|---|---|---|---|
| 10,146,375 B2* | 12/2018 | Shahar | G06V 40/20 |
| 11,360,568 B2* | 6/2022 | Fukushima | H04N 23/56 |
| 2012/0140096 A1* | 6/2012 | Ostlund | H04N 9/3129 |
| | | | 348/241 |
| 2012/0146903 A1* | 6/2012 | Arihara | G06F 3/017 |
| | | | 345/158 |
| 2012/0249416 A1 | 10/2012 | Maciocci et al. | |
| 2015/0219808 A1* | 8/2015 | Gill | G02B 5/1842 |
| | | | 348/335 |
| 2015/0253193 A1 | 9/2015 | Schilz et al. | |
| 2015/0317518 A1 | 11/2015 | Fujimaki et al. | |
| 2017/0060242 A1* | 3/2017 | Gill | G02B 5/1871 |
| 2017/0086256 A1 | 3/2017 | Chen | |
| 2017/0214862 A1* | 7/2017 | Matsubara | H04N 21/42204 |
| 2019/0020789 A1* | 1/2019 | Shimano | G02F 1/13306 |
| 2020/0201446 A1* | 6/2020 | Kim | G06F 3/017 |
| 2021/0141236 A1 | 5/2021 | Shimano | |

FOREIGN PATENT DOCUMENTS

| | | |
|---|---|---|
| JP | 2015-213212 A | 11/2015 |
| WO | 2017/145348 A1 | 8/2017 |

* cited by examiner

PROJECTION IMAGE OF
PHOTOGRAPHING PATTERN 805

DEVELOPING PATTERN 1501

Φ=0    Φ=π/2    Φ=π    Φ=3π/2

FIG. 36
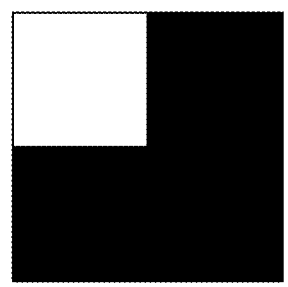 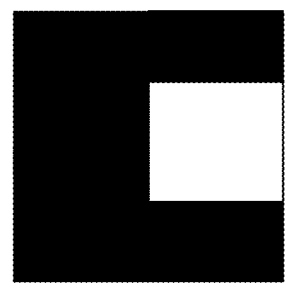
(a) (b)

FIG. 37
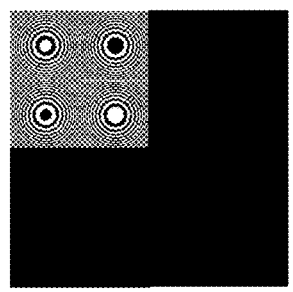 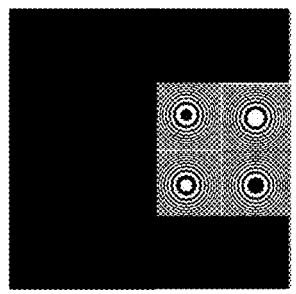
(a) (b)

IMAGE DISPLAY APPARATUS AND IMAGE DISPLAY METHOD

TECHNICAL FIELD

The present invention relates to an image display apparatus and an image display method.

BACKGROUND ART

In order to support work in factory work and equipment maintenance work, a head mounted image display apparatus has been utilized. In many cases, a worker is holding an article necessary for objective work, and it is required that an input method to the image display apparatus is simple. As a simple input method, input means by a voice operation or a gesture operation has been devised.

In order to realize the gesture operation, it is necessary to recognize a target object to be gestured, and to further recognize a motion of the target object. In order to recognize a target object and a motion thereof, a three-dimensional recognition technique using a range image is utilized. For example, as Patent Document 1, a method of measuring a distance between an image display unit and a target object by using a TOF (Time Of Flight) sensor to realize gesture recognition has been devised.

RELATED ART DOCUMENTS

Patent Documents

Patent document 1: Japanese Patent Application Publication No. 2015-213212

SUMMARY OF THE INVENTION

Problems to be Solved by the Invention

As a method of obtaining a range image for recognizing gesture, there are cited a method of using a TOF sensor as described in Patent Document 1 described above, a method of using an active TOF type or Structured Light type three-dimensional distance measuring sensor, and a passive type method by a stereo camera type. However, each of the methods has a problem that a head mounted image display apparatus becomes large and is expensive in order to install it in the head mounted image display apparatus. As a result, a size of the image display apparatus is increased, and this becomes a load on a user thereof.

Further, as described above, in order to optimize a visual field area, usage of a wide angle lens or a fisheye lens, or optimization of a method of installing a distance measuring sensor may be cited. However, these also become factors that increase the size of the apparatus. As a result, a user who wears the apparatus imposes a burden.

It is an object of the present invention to provide an image display apparatus and a display method capable of reducing a load on a user when the user wears the apparatus.

The foregoing and other objects, and new features of the present invention will become more apparent from the detailed description of the present specification and the appending drawings.

Means for Solving the Problem

An outline of representative invention of the present invention disclosed in the present application will briefly be explained as follows.

According to a representative embodiment of the present invention, there is provided an image display apparatus capable of being mounted on a head of a user. The image display apparatus includes: an image sensor configured to convert an optical image into an image signal and output the converted image signal, the optical image being captured by a plurality of light receiving elements arranged in an array on an imaging surface; a modulator provided on a light receiving surface of the image sensor, the modulator having a first pattern that includes a plurality of patterns different from each other, the modulator being configured to modulate intensity of light; a gesture detecting unit configured to divide image data obtained by receiving light transmitted through the modulator by the image sensor in accordance with the plurality of patterns included in the first pattern, the gesture detecting unit being configured to restore an image by calculation based on a second pattern corresponding to the first pattern, the gesture detecting unit being configured to obtain an image for detecting gesture of the user; a gesture recognizing unit configured to specify the gesture of the user by using the image obtained by the gesture detecting unit, the gesture recognizing unit being configured to recognize an instruction corresponding to the specified gesture; and an image display unit configured to display a result based on the instruction recognized by the gesture recognizing unit.

Effects of the Invention

Effects obtained by the representative invention of the present invention disclosed in the present application will briefly be explained as follows.

Namely, according to the representative embodiment of the present invention, it is possible to reduce a load on a user when the user wears the apparatus.

BRIEF DESCRIPTIONS OF THE DRAWINGS

FIG. 36 is a view illustrating an embodiment of a liquid crystal display pattern;

FIG. 37 is a view illustrating an embodiment of an effective pattern of the modulator;

DETAILED DESCRIPTION OF EMBODIMENTS

Figure 1:
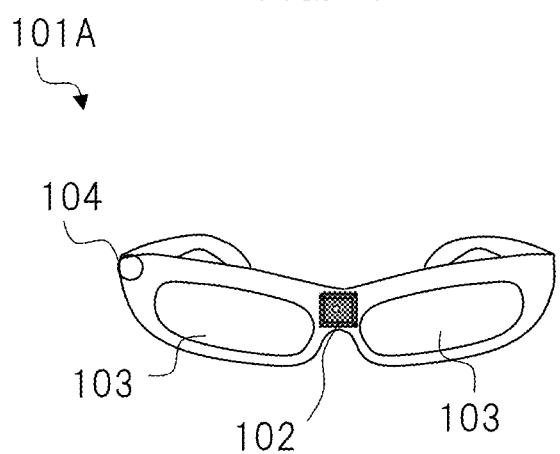
FIG. 1 is a view illustrating an outline of an image display apparatus according to a first embodiment.

Hereinafter, embodiments of the present invention will be described in detail with reference to the drawings. Note that Further, the same components are in principle denoted by the same reference numeral throughout the drawings for describing the embodiments, and the repetitive description thereof will be omitted. On the other hand, a component that has been explained in a certain drawing by applying a reference numeral thereto is not illustrated again when another drawing is to be explained, but the component may be referred to by applying the same reference numeral thereto.

First Embodiment

FIG. 1 is a view illustrating an outline of an image display apparatus according to a first embodiment. An image display apparatus 101A according to an embodiment of the present invention is an eyeglass type image display apparatus (that is, an image display apparatus that can be mounted or worn on a head of a user), and is an apparatus that displays an image in portions corresponding to positions of lenses in so called eyeglasses. The image display apparatus 101A includes a distance measuring sensor unit 102, image display units 103, and a light source unit 104. The image display apparatus 101A is an example in which an image display function and a calculation processing function are integrated with an image display apparatus 101 to be worn or mounted on a head.

The image display apparatus 101A displays information (for example, an image or the like) in the image display units 103 positioned at the portions corresponding to the lens portions of the eyeglasses. Further, the image display apparatus 101A specifies gesture of the user by means of the distance measuring sensor unit 102 and the like; recognizes an operation (or an instruction) corresponding to the specified gesture; and changes the content to be displayed in the image display units 103 in accordance with the recognized operation. As illustrated in FIG. 1, the image display apparatus 101A is an eyeglass type apparatus, but is not limited to this. The image display apparatus 101A may have a shape by which the image display apparatus 101A can be mounted on the head.

Further, the image display units 103 described above may not be provided at positions corresponding to both eyes, and may be provided at a position corresponding to one eye. Further, the distance measuring sensor unit 102 may not be provided at a center portion of the image display apparatus 101, but may be provided at an end portion of the image display apparatus 101, for example. In this case, compared with a case where the distance measuring sensor unit 102 is installed at the center, it is possible to improve designability because the distance measuring sensor unit 102 becomes less noticeable.

Further, the light source unit 104 is set in advance so as to be capable of irradiating an area beyond a distance measuring range of the distance measuring sensor unit 102.

For example, in a case where an irradiation range of one light source is narrow, a plurality of light sources is provided. For example, the light source units 104 may be respectively provided at both sides of the image display apparatus 101. This makes it possible to widen the irradiation range.

Figure 2:
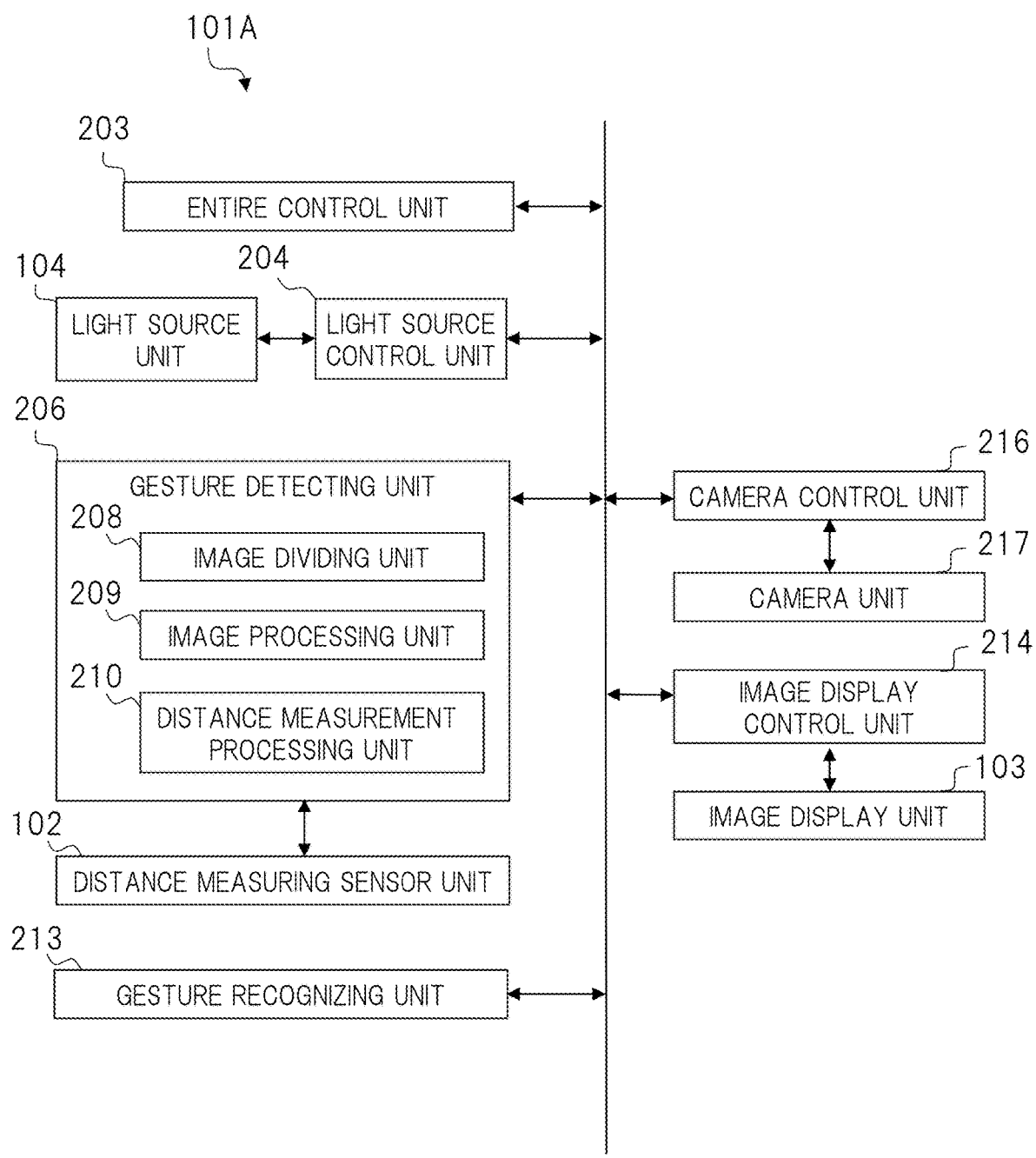
FIG. 2 is a view illustrating a functional configuration of the image display apparatus according to the first embodiment.

Subsequently, functions of the image display apparatus 101 according to the first embodiment will be described with reference to FIG. 2. FIG. 2 is a view illustrating a functional configuration of the image display apparatus 101A according to the first embodiment. As illustrated in FIG. 2, the image display apparatus 101A includes the distance measuring sensor unit 102, the image display unit 103, the light source unit 104, an entire control unit 203, a light source control unit 204, a gesture detecting unit 206, an image dividing unit 208, an image processing unit 209, a distance measurement processing unit 210, a gesture recognizing unit 213, an image display control unit 214, a camera control unit 216, and a camera unit 217.

The distance measuring sensor unit 102 is a part for imaging a photographic subject. Details thereof will be described later. The image display unit 103 is a part for displaying an image, and is a display device or the like. The light source unit 104 is a part for irradiating light. For example, the light source unit 104 irradiates near infrared light.

The entire control unit 203 is a central processing unit, and is a portion that executes the whole control in the image display apparatus 101A. The entire control unit 203 is realized by a CPU (Central Processing Unit) or the like, for example.

The light source control unit 204 is a part for controlling the light source unit 104, and operates the light source unit 104 at predetermined intervals. The light source control unit 204 is realized by a CPU or the like.

The gesture detecting unit 206 is a part of controlling the distance measuring sensor unit 102 to obtain an image for detecting gesture on the basis of image data obtained by the distance measuring sensor unit 102. The gesture detecting unit 206 is realized by a GPU (Graphics Processing Unit) or the like. The gesture detecting unit 206 has the image dividing unit 208, the image processing unit 209, and the distance measurement processing unit 210. When the image for detecting gesture is obtained, the gesture detecting unit 206 transmits the image to the gesture recognizing unit 213. Details of the gesture detecting unit 206 will be described later.

The gesture recognizing unit 213 is a part for recognizing gesture on the basis of the image detected by the gesture detecting unit 206, and executing a process based on the gesture. The gesture recognizing unit 213 is realized by a CPU or the like. When the image for detecting gesture is obtained from the gesture detecting unit 206, the gesture recognizing unit 213 analyzes the obtained image, specifies gesture of a target object (for example, a hand of the user), and recognizes an instruction corresponding to the specified gesture, thereby recognizing the gesture. The gesture recognizing unit 213 in advance stores information in which gesture and meaning of the gesture are associated with each other, and recognizes the instruction indicated by the specified gesture.

When the gesture is recognized, the gesture recognizing unit 213 transmits an instruction signal to the image display control unit 214 on the basis of the meaning of the gesture.

The image display control unit 214 is a part for controlling the image display unit 103. The image display control unit 214 receives the instruction signal from the gesture recognizing unit 213 or the like, and causes the image display unit 103 to display an image on the basis of the instruction signal. In a case where an instruction signal indicating enlargement of the image displayed by the image display unit 103 is received, for example, the image display control unit 214 enlarges and displays the displaying image.

The camera control unit 216 is a part for controlling the camera unit 217. When an instruction signal by the entire control unit 203 or the like is received, the camera control unit 216 operates the camera unit 217. Further, when an image is obtained from the camera unit 217 as a result that the camera unit 217 is operated, the camera control unit 216 transmits the image to the image display control unit 214.

The camera unit 217 is an imaging means, and is a part configured to take a still image or a moving image of an outside world. The camera unit 217 photographs the outside world in response to an instruction signal by the camera control unit 216, and transmits a photographed result to the camera control unit 216.

Figure 3:
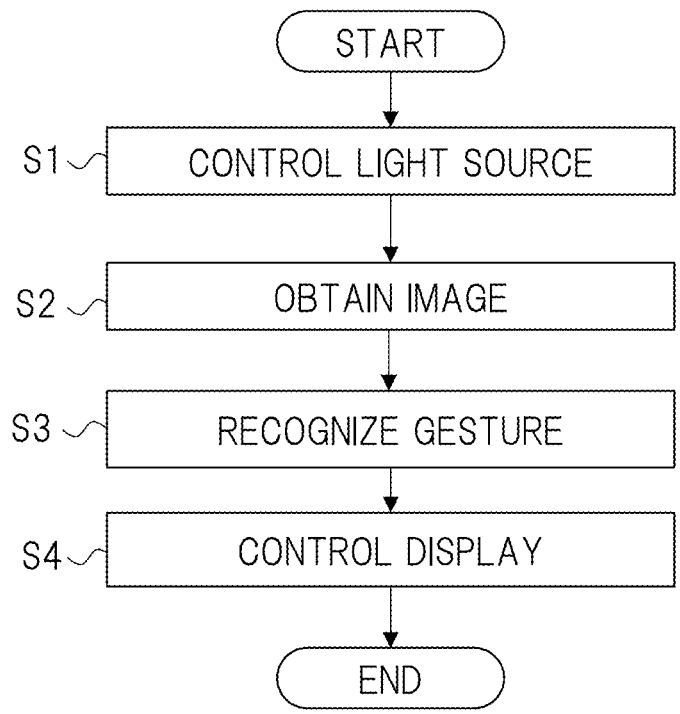
FIG. 3 is a view illustrating a processing flow by an example of the image display apparatus.

Subsequently, a processing procedure by the image display apparatus 101 will be described with respect to FIG. 3. FIG. 3 is a flowchart illustrating a procedure to recognize gesture of a user by the image display apparatus 101A and execute processes based on the recognized gesture. The entire control unit 203 executes the whole control of processes illustrated in FIG. 3.

First, at predetermined timing, the light source control unit 204 controls the light source unit 104 to adjust an amount of light to be irradiated and irradiate light (Step S1). Subsequently, the gesture detecting unit 206 obtains an image for detecting gesture on the basis of image data obtained by the distance measuring sensor unit 102 (Step S2). The gesture recognizing unit 213 recognizes gesture on the basis of the image obtained by the gesture detecting unit 206 (Step S3). The image display control unit 214 executes a display control in response to an instruction signal based on a recognition result by the gesture recognizing unit 213 (Step S4), and terminates the processing.

Subsequently, before details of configurations of the gesture detecting unit 206 and the distance measuring sensor unit 102 will be described, basic principle of imaging and distance measuring by using the distance measuring sensor unit 102 will be described.

<Photographing Principle of Infinite Object>

Figure 4:
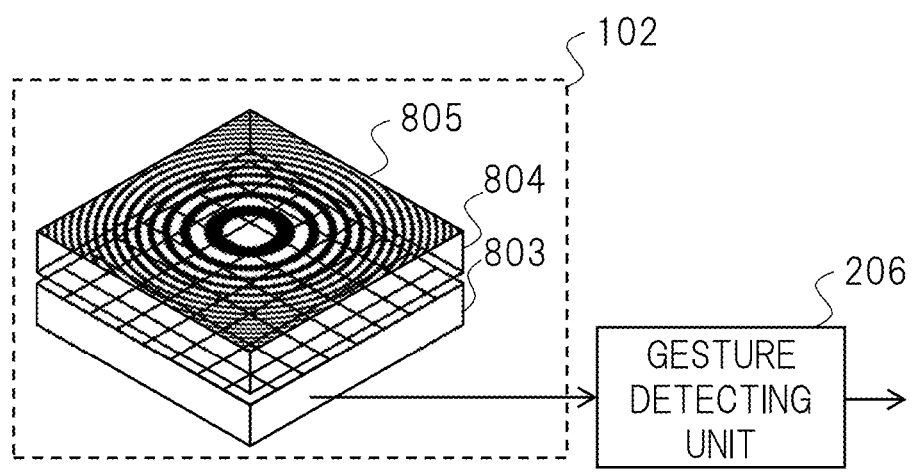
FIG. 4 is a view illustrating an example of a basic imaging apparatus using a distance measuring sensor.

FIG. 4 is an explanatory drawing illustrating one example of a basic configuration of an imaging apparatus using the distance measuring sensor unit 102 according to the present embodiment. The distance measuring sensor unit 102 is configured to obtain an image of an object in an outside world without using a lens that forms an image. As illustrated in FIG. 4, the distance measuring sensor unit 102 is configured to calculate an image obtained by the distance measuring sensor unit 102 by using the gesture detecting unit 206.

Figure 5:
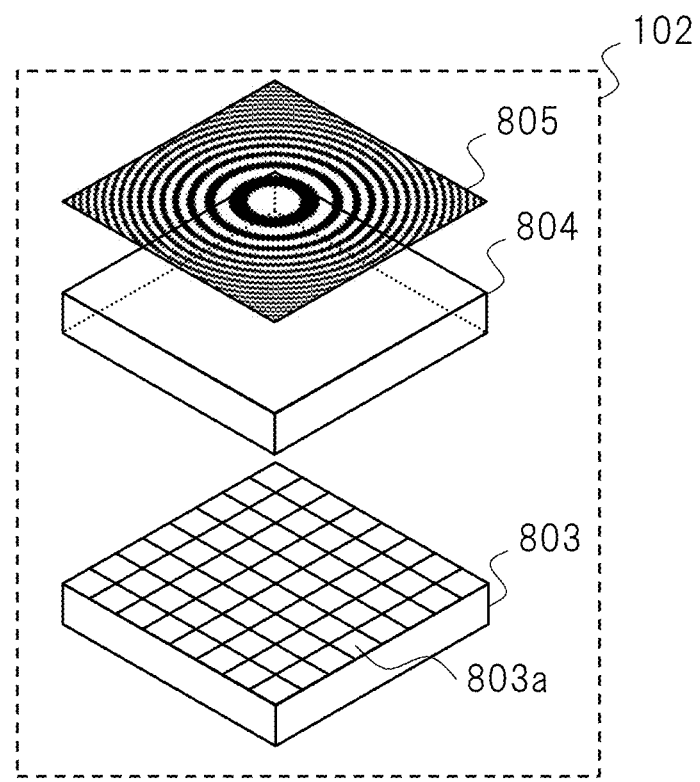
FIG. 5 is a view illustrating an imaging unit in the basic imaging apparatus using the distance measuring sensor.

A structure of the distance measuring sensor unit 102 will be described with reference to FIG. 5. FIG. 5 is a view illustrating a configuration example of the distance measuring sensor unit 102. The distance measuring sensor unit 102 is constructed by an image sensor 803, a pattern substrate 804, a photographing pattern 805 (first pattern). The pattern substrate 804 is fixed so as to adhere tightly to a light receiving surface of the image sensor 803, and is configured so that the photographing pattern 805 is formed on the pattern substrate 804.

The pattern substrate 804 is made of transparent material, such as glass or plastic, with respect to visible light, for example. The photographing pattern 805 is formed by depositing metal such as aluminum or chromium by a sputtering method used for a semiconductor process, for example. A pattern can be shaded by a pattern in which aluminum is deposited and a pattern in which aluminum is not deposited.

Note that formation of the photographing pattern 805 is not limited to this. For example, the pattern may be formed by shading by means of printing of an ink jet printer. The pattern may be formed by any means so long as modulation of a transmission factor can be realized. Further, the visible light has been described herein as an example. For example, when photographing by far infrared ray is executed, material transparent to the far infrared ray, such as germanium, silicon, or chalcogenide, that is, material transparent to a wavelength that becomes a photographing target may be used for the pattern substrate 804, for example, and material that blocks the far infrared ray may be used for the photographing pattern 805.

Figure 6:
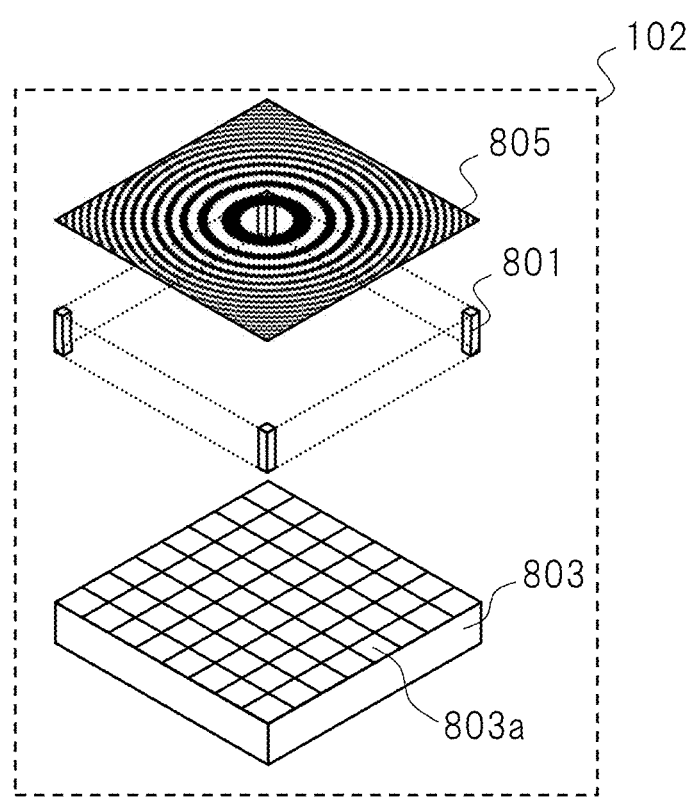
FIG. 6 is a view illustrating an imaging unit in the basic imaging apparatus using the distance measuring sensor.

Note that the method of forming the photographing pattern 805 on the pattern substrate 804 has been mentioned herein, but as illustrated in FIG. 6, it can also be realized by forming the photographing pattern 805 as a thin film, and holding the photographing pattern 805 by supporting members 801. Note that in this apparatus, a photographing field angle can be changed by a thickness of the pattern substrate 804. Therefore, for example, when the pattern substrate 804 is configured as illustrated in FIG. 6 and has a function to be capable of changing a length of each of the supporting members 801, it is possible to execute photographing while changing a field angle during the photographing.

Returning to FIG. 5, pixels 803a that are light receiving elements are regularly arranged on a surface of the image sensor 803 in a grid-like (or array) manner. This image sensor 803 converts a light image received by the pixels 803a into an image signal that is an electric signal. The image signal outputted from the image sensor 803 is subjected to image processing by the gesture detecting unit 206, and is outputted to the gesture recognizing unit 213. Thus, the image sensor 803 converts optical images respectively captured by a plurality of light receiving elements arranged in an array on an imaging surface into image signals, and outputs the converted image signals.

In a case where it is photographed by the above configuration, intensity of light of light for transmitting the photographing pattern 805 is modulated by the photographing pattern 805, the transmitted light is received by the image sensor 803. The image signal outputted from the image sensor 803 is subjected to image processing by the image processing unit 209 included in the gesture detecting unit 206, and is outputted to the gesture recognizing unit 213.

Subsequently, a photographing principle in the distance measuring sensor unit 102 will be described. First, the photographing pattern 805 is a concentric circle-shaped pattern in which pitches fine down so as to be inversely proportional to radii from a center thereof, and is defined as $I(r)=1+\cos \beta r^2$ (Formula (1)) by using a radius r from a reference coordinate that is a center of the concentric circles and a coefficient $\beta$. A transmission factor of the photographing pattern 805 is modulated so as to be proportional to this formula.

Figure 7:
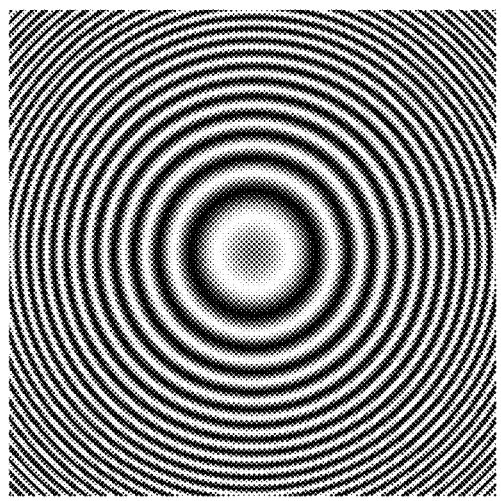
FIG. 7 is a view illustrating an example of a photographing pattern or a developing pattern.
Figure 8:
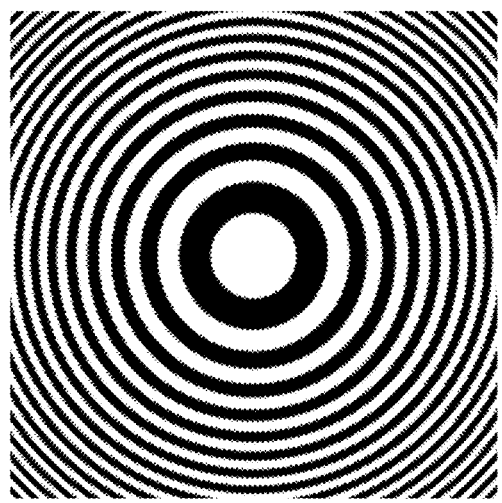
FIG. 8 is a view illustrating another example of the photographing pattern or the developing pattern.

A plate with such fringes is called as a Gabor zone plate or a Fresnel zone plate. FIG. 7 illustrates an example of the Gabor zone plate by Formula (1), and FIG. 8 illustrates an example of the Fresnel zone plate by binarizing Formula (1) by a threshold value 1. Note that, hereinafter, only an x axis direction will be described by formulas for simplification, but it is possible to two-dimensionally develop and consider the plate by considering a y axis direction in the similar manner.

Figure 9:
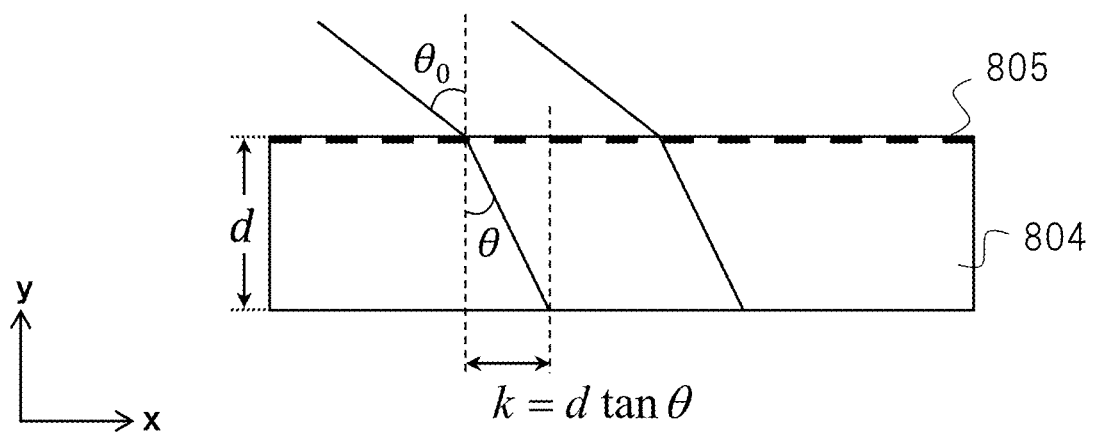
FIG. 9 is a view for explaining that a projection image from a pattern substrate surface to an image sensor by oblique incidence parallel light generates in-plane shift.
Figure 10:
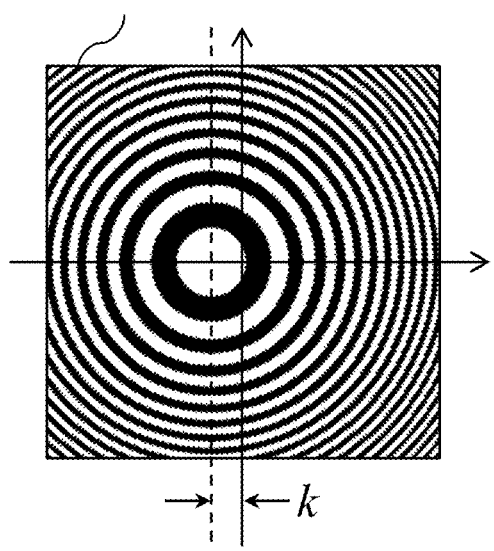
FIG. 10 is a view illustrating a projection image of an embodiment of a photographing pattern.

It is assumed that as illustrated in FIG. 9, parallel light enters the pattern substrate 804, on which the photographing pattern 805 is formed, with a thickness d at an angle $\theta_0$ with respect to the y axis direction. By defining a refracting angle in the pattern substrate 804 as $\theta$, light multiplied by a transmission factor of a surface grid geometrical-optically enters the image sensor 803 while being shifted by $k=d\times\tan\theta$. At this time, a projection image with intensity distribution like $I_p(x)=1+\cos[\beta(x+k)^2+\phi]$ (Formula (2)) is detected on the image sensor 803. Note that $\phi$ indicates an initial phase of transmission factor distribution in Formula (1). FIG. 10 illustrates an example of the projection image of this photographing pattern 805. The image is shifted by k as Formula (2) and is projected. This becomes an output of the distance measuring sensor unit 102.

Next, development processing by a correlation developing method and a moire developing method of the image processing unit 209 will be described.

Figure 11:
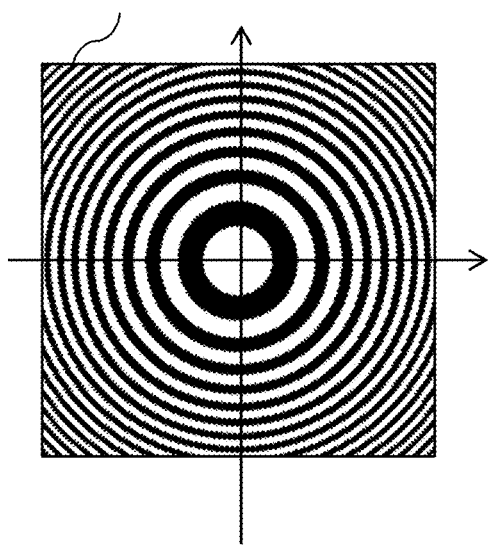
FIG. 11 is a view illustrating an embodiment of a developing pattern.
Figure 12:
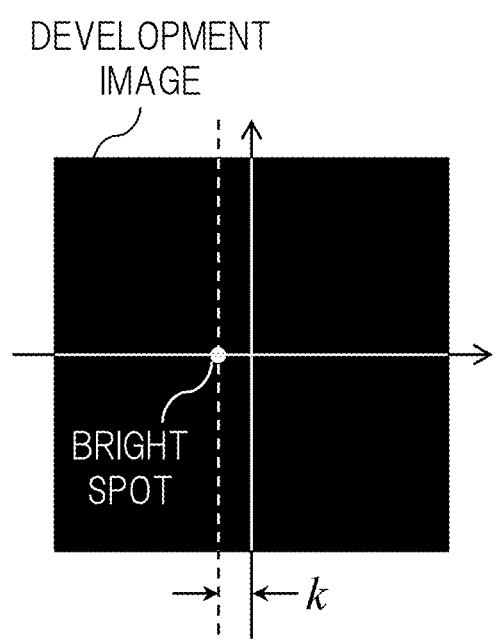
FIG. 12 is a view illustrating an embodiment of a development image by a correlation developing method.

In the correlation developing method, the image processing unit 209 calculates a cross correlation function between the projection image of the photographing pattern 805 (FIG. 10) and a developing pattern 1501 (FIG. 11) that is a second pattern, thereby obtaining a bright spot with a shift amount k (FIG. 12). Note that when the cross correlation calculation is executed by two-dimensional convolution calculation, a calculation amount generally becomes larger. Thus, a principle of an example of calculation using Fourier transform will be described using formulas. First, the developing pattern 1501 uses the Gabor zone plate or the Fresnel zone plate in the similar manner to the photographing pattern 805. Thus, by using an initial phase $\Phi$, the developing pattern 1501 is expressed as $I_B(x)=\cos(\beta x^2|\Phi)$ Formula (3). Since the developing pattern 1501 is used in the image processing, it is not necessary to be offset by "one" as Formula (1), and there is no problem even if it has a negative value.

Fourier transforms of Formulas (1) and (3) are respectively as follows:

$$\mathcal{F}[I_F(x)] = \delta(u) + \frac{e^{-iku}}{2\sqrt{\pi\beta}} \sin\left(\frac{u^2}{4\beta} - \Phi + \frac{\pi}{4}\right) \quad \text{Formula (4)}$$

$$\mathcal{F}[I_B(x)] = \frac{1}{2\sqrt{\pi\beta}} \sin\left(\frac{u^2}{4\beta} - \Phi + \frac{\pi}{4}\right). \quad \text{Formula (5)}$$

Here, F indicates calculation of Fourier transform, u is a frequency coordinate in an x direction, and $\delta$ with parentheses is a delta function. What is important in this formula is that the formula after Fourier transform also becomes the Fresnel zone plate or the Gabor zone plate. Therefore, the image processing unit 209 may directly generate a developing pattern after Fourier transform on the basis of this formula. This makes it possible to reduce a calculation amount. Next, by multiplying Formulas (4) and (5), it becomes $$\mathcal{F}[I_F(x)] \cdot \mathcal{F}[I_B(x)] = \frac{1}{2\sqrt{\pi\beta}} \sin\left(\frac{\pi}{4} - \Phi\right)\delta(u) + \frac{e^{-iku}}{8\pi\beta} \cdot \left[\sin^2\left(\frac{u^2}{4\beta} - \Phi + \frac{\pi}{4}\right)\right]$$

(Formula (6)). The term $\exp(-iku)$ expressed by this exponential function is a signal component, and this term is subjected to Fourier transform to be converted as $\mathcal{F}^{-1}$ [$e^{-iku}$]=$2\pi\delta(x+k)$ (Formula (7)). It is possible to obtain a bright spot at a position of k on the original x axis. This bright spot indicates a light flux at infinite, and is no other than a photographing image by the distance measuring sensor unit 102 illustrated in FIG. 5.

Note that the correlation developing method may be realized by a pattern that is not limited to the Fresnel zone plate or the Gabor zone plate, for example, a random pattern so long as an autocorrelation function of the pattern has a single peak.

Figure 13:
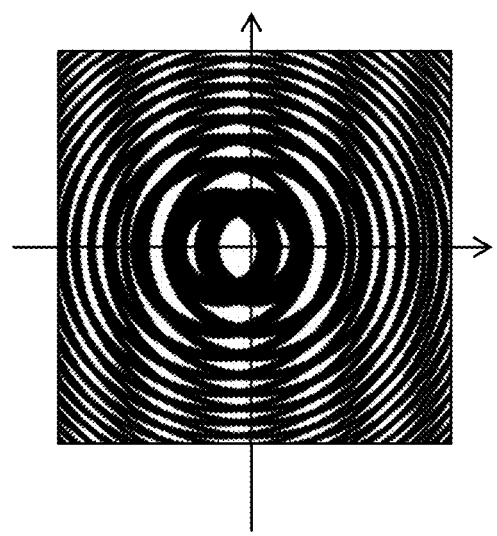
FIG. 13 is a view illustrating an embodiment of a moire fringe by a moire developing method.
Figure 14:
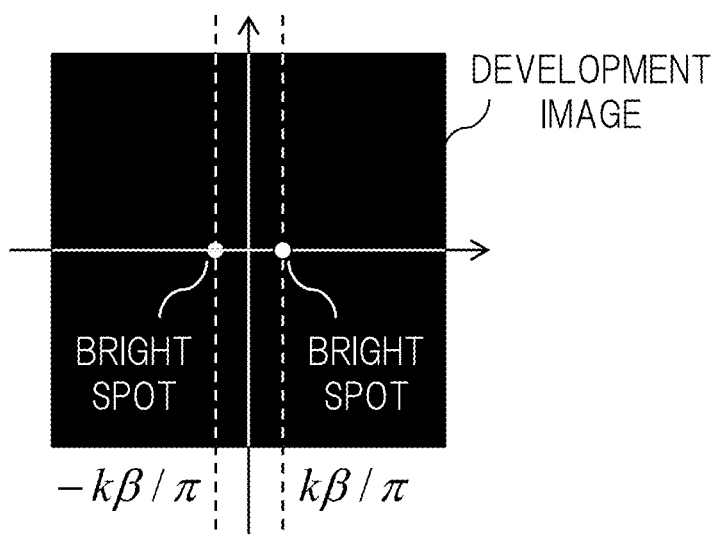
FIG. 14 is a view illustrating an embodiment of the development image by the moire developing method.

Next, in the moire developing method, the image processing unit 209 generates moire fringes (FIG. 13) by multiplying the projection image of the photographing pattern 805 (FIG. 10) and the developing pattern 1501 (FIG. 11), and obtains bright spots with a shift amount $k\beta/n$ (FIG. 14) by Fourier transform. When this moire fringe is indicated by a formula, it becomes $$I_F(x) \cdot I_B(x) = \{1+\cos[\beta(x+k)^2+\Phi]\}\cos(\beta x^2+\Phi) = \frac{1}{2}[2\cos(\beta x^2+\Phi)+\cos(2\beta x^2+2k\beta x+2\beta k^2+2\Phi)+\cos(2k\beta x+\beta k^2)]$$

(Formula (8)). It can be seen that a third term of this expansion is a signal component and an area in which straight, equally spaced interval patterns are overlapped in the direction of shift of the two patterns. A fringe generated at relatively low spatial frequency due to such overlap of such fringes is called as a moire fringe. Two-dimensional Fourier transform of this third term becomes $$\mathcal{F}[\cos 2k\beta x] = \delta\left(u+\frac{k\beta}{\pi}\right)+\delta\left(u-\frac{k\beta}{\pi}\right). \quad \text{(Formula (9))}$$

Here, F indicates calculation of Fourier transform, u is a frequency coordinate in the x direction, and $\delta$ with parentheses is a delta function. It can be seen from this result that a peak of spatial frequency occurs at a position of $u=\pm k\beta/\pi$ in a spatial frequency spectrum of the moire fringe. This bright spot indicates a light flux at infinite, and is no other than a photographing image by the distance measuring sensor unit 102 illustrated in FIG. 5. Thus, the image processing unit 209 restores an image by calculation based on the second pattern.

<Noise Cancellation>

Although a signal component is focused in conversion from Formula (6) to Formula (7) and conversion from Formula (8) to Formula (9), terms other than the signal component actually impede the development. Therefore, the image processing unit 209 executes noise cancellation based on fringe scanning. By using orthogonality of a trigonometric function, when a multiplication result of Formula (6) is integrated with respect to $\Phi$ as $$\int_0^{2\pi} \mathcal{F}[I_F(x)] \cdot \mathcal{F}[I_B(x)] d\Phi = \frac{1}{4\beta}e^{-iku} \quad \text{(Formula (10))}$$

in the correlation developing method, a noise term is cancelled and a constant multiple of the signal term remains. Similarly, when a multiply result of Formula (8) is integrated with respect to $\Phi$ as $\int_0^{2\pi} I_F(x) \cdot I_S(x) a\Phi = \pi \cos(2k\beta x+\beta k^2)$ (Formula (11)) in the moire developing method, a noise term is cancelled and a constant multiple of the signal term remains.

Figure 15:
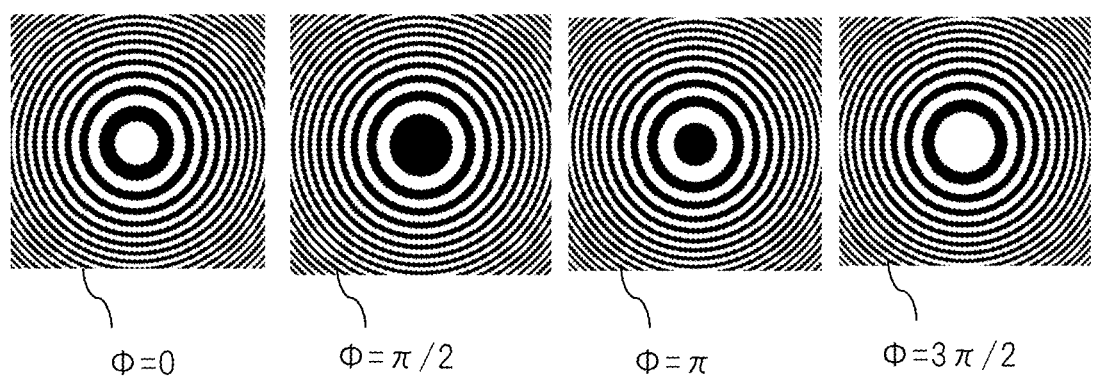
FIG. 15 is a view illustrating an embodiment of a combination of initial phases in fringe scanning.

Note that each of Formulas (10) and (11) is indicated by an integral form, but it is also possible to obtain the similar effect actually by calculating the toral sum of a combination of (as illustrated in FIG. 15. Like this combination, (may be set so that an angle between 0 and $2\pi$ is equally divided.

In the fringe scanning that has been explained above, it is necessary to use a plurality of patterns each having a different initial phase as the photographing pattern 805. In order to realize this, for example, there is a method of switching patterns by space division.

Figure 16:
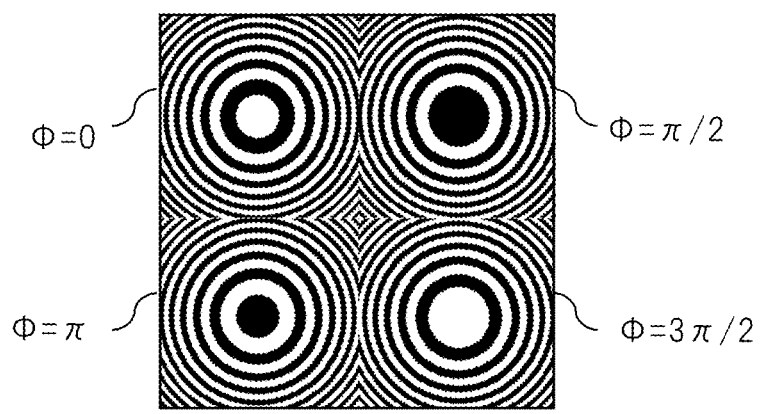
FIG. 16 is a view illustrating an embodiment of a photographing pattern.

In order to realize space division fringe scanning, as illustrated in FIG. 16, the image processing unit 209 executes processing by using the photographing pattern 805 with a plurality of initial phases. After one image is obtained, the image processing unit 209 divides the one image into four in accordance with each initial phase pattern in the image processing unit 209, and executes fringe scanning calculation.

Subsequently, an outline of the image processing by the image processing unit 209 based on an imaging principle described above will be described.

Figure 17:
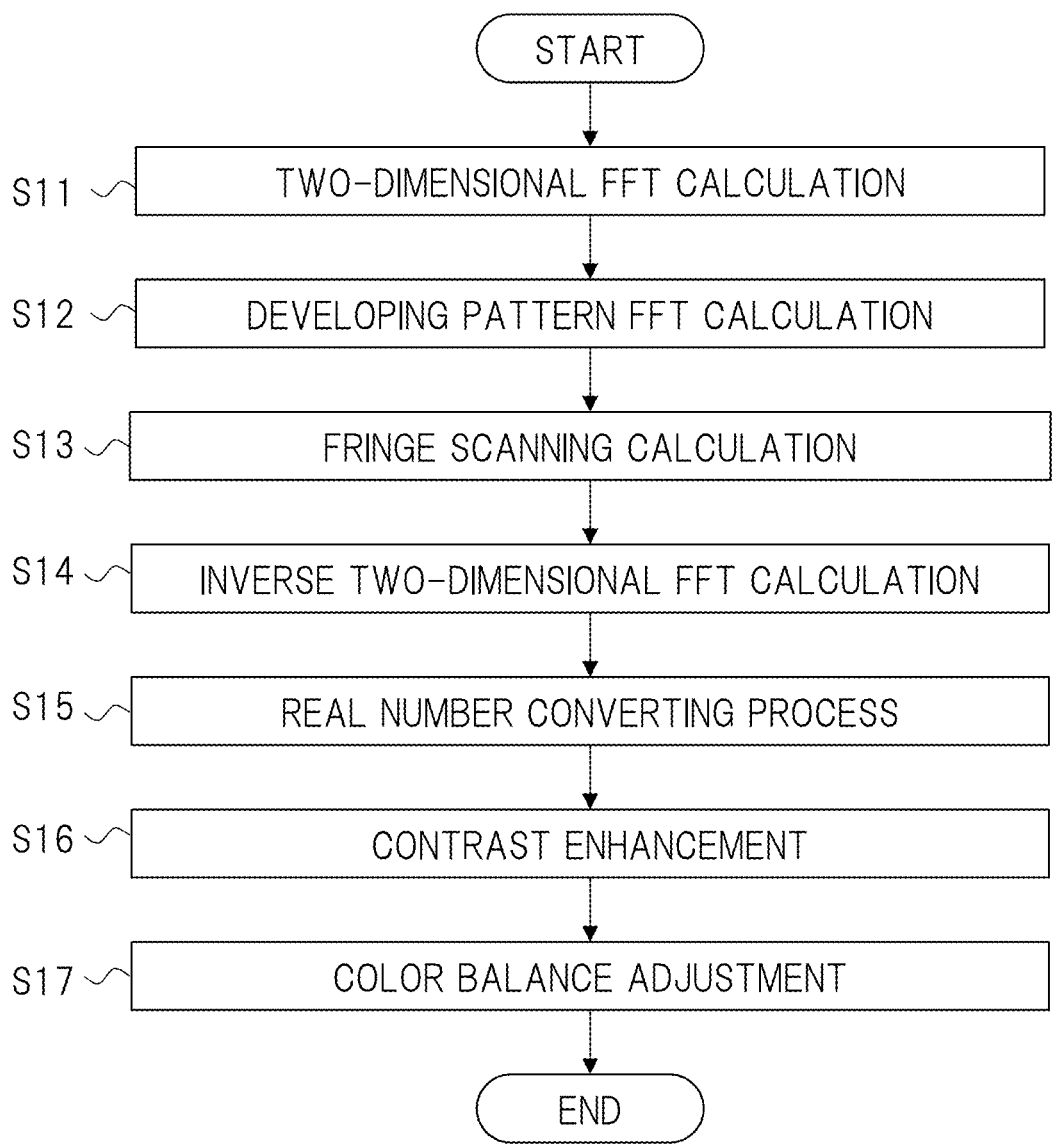
FIG. 17 is a view illustrating a processing flow of an embodiment of an image processing unit by the correlation developing method.

FIG. 17 is a flowchart illustrating an outline in a case where the image processing unit 209 uses the correlation developing method. First, the image processing unit 209 obtains a plurality of sensor images outputted from the image sensor 803 by the space division fringe scanning, and executes two-dimensional Fast Fourier transform (FFT: Fast Fourier Transform) calculation for each of the sensor images (Step S11). Next, the image processing unit 209 generates a developing pattern 1501 to be used for the development processing by executing developing pattern FFT calculation (Step S12). Subsequently, the image processing unit 209 executes fringe scanning calculation on the basis of Formula (10) (Step S13), and executes inverse two-dimensional FFT calculation (Step S14).

Since this calculation result becomes a complex number, the image processing unit 209 executes a real number converting process in which an absolute value or a real part is taken to convert an image of a photographing target into a real number and develop it (Step S15). The image processing unit 209 then executes, with respect to the obtained image, contrast enhancement processing (Step S16) and color balance adjustment (Step S17), and outputs it as a photographing image. As described above, the image processing by the image processing unit 209 is terminated.

Figure 18:
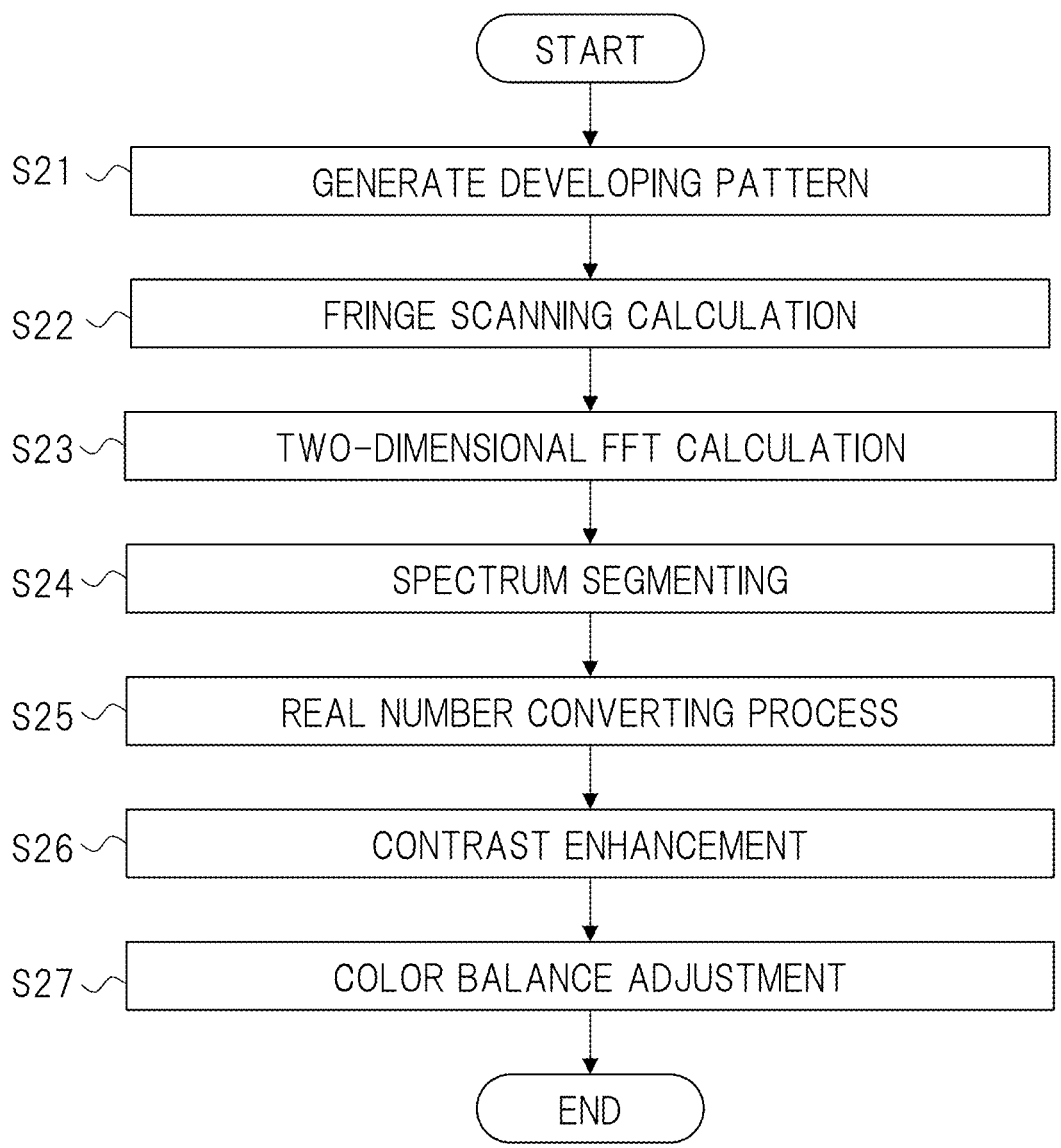
FIG. 18 is a view illustrating a processing flow of an embodiment of the image processing unit by the moire developing method.

On the other hand, FIG. 18 is a flowchart illustrating an outline in a case where the image processing unit 209 uses the moire developing method. First, the image processing unit 209 obtains a plurality of sensor images outputted from the image sensor 803 by the space division fringe scanning. Subsequently, the image processing unit 209 generates a developing pattern 1501 to be used for the development processing (Step S21), and executes fringe scanning calculation for each of the sensor images on the basis of Formula (11) (Step S22). The image processing unit 209 obtains a frequency spectrum by executing two-dimensional FFT calculation for this (Step S23), and executes spectrum segmenting for segmenting data on a necessary frequency area of this frequency spectrum (Step S24). The following processes (that is, processes at Step S25 to Step S27) are respectively similar to the processes at Steps S15 to S17 in FIG. 17.

<Photographing Principle of Finite Distance Object>

Figure 19:
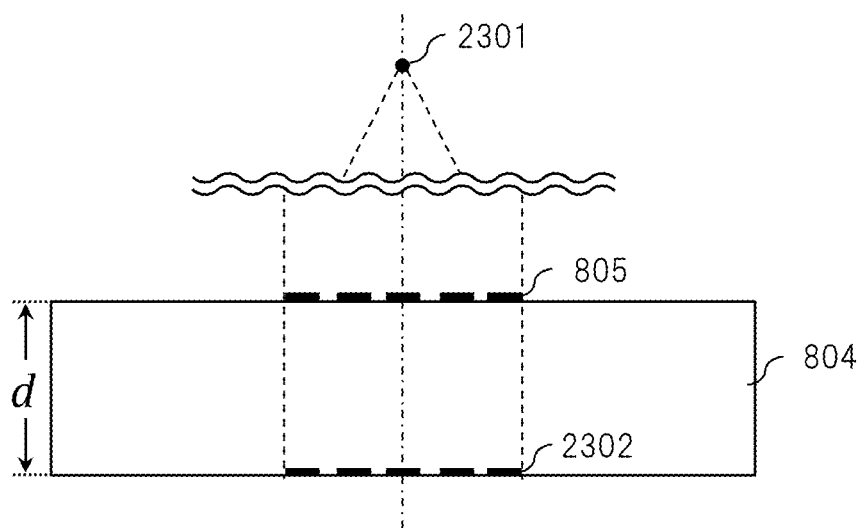
FIG. 19 is a view illustrating that a photographing pattern is projected in a case where an object is positioned at an infinite distance.

Next, FIG. 19 illustrates a state of projection of the photographing pattern 805 to the image sensor 803 in a case where a photographic subject is distant as mentioned above. A spherical wave from a point 2301 that constitutes a distant object becomes a plane wave while propagating a sufficient long distance, and irradiates the photographing pattern 805. In a case where a projection image 2302 thereof is projected to the image sensor 803, the projection image has substantially the same shape as the photographing pattern 805. As a result, it is possible to obtain a single bright spot by executing the development processing for the projection image 2302 using a developing pattern.

Figure 20:
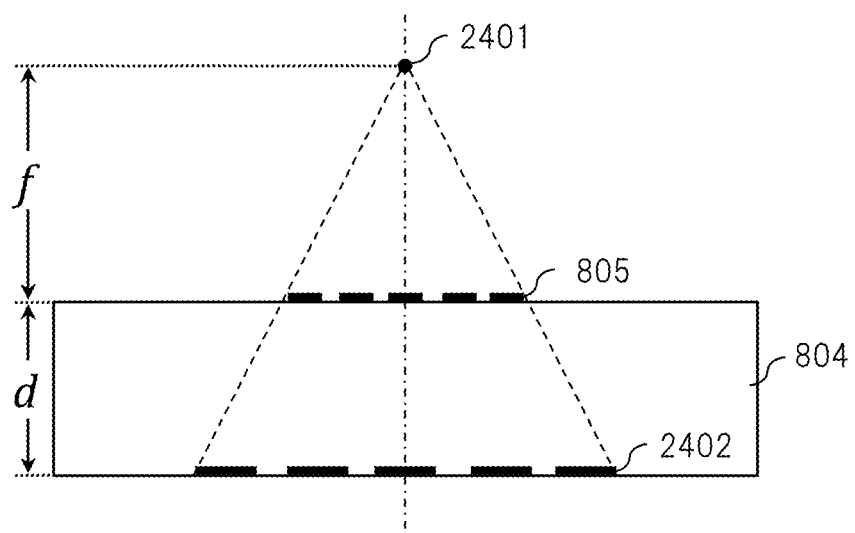
FIG. 20 is a view illustrating that a photographing pattern is enlarged in a case where an object is positioned at a finite distance.

On the other hand, imaging of an object with a finite distance will be described. FIG. 20 is an explanatory drawing illustrating that projection of the photographing pattern 805 to the image sensor 803 is enlarged by the photographing pattern 805 in a case where an object to be imaged is at a finite distance.

In a case where a spherical wave from a point 2401 that constitutes an object irradiates the photographing pattern 805 and a projection image 2402 is projected to the image sensor 803, the projection image is enlarged substantially evenly. Note that the gesture detecting unit 206 can calculate this magnification ratio $\alpha$ as $$\alpha = \frac{f+d}{f} \tag{12}$$

by using a distance f between the photographing pattern 805 and the point 2401.

Therefore, if a developing pattern designed for parallel light is used as it is to execute development processing, it is impossible to obtain a single bright spot. Therefore, in a case where the developing pattern 1501 is enlarged in accordance with the evenly enlarged projection image of the photographing pattern 805, a single bright spot can be obtained again for the enlarged projection image 2402. For this reason, it is possible to correct a coefficient $\beta$ of the developing pattern 1501 by setting $\beta/\alpha^2$.

This makes it possible to selectively reproduce light from the point 2301 positioned at a distance that is not necessarily infinite. Therefore, it is possible to photograph the pattern by focusing on an arbitrary position. In other words, it is possible to calculate a distance to the arbitrary position. The present principle allows distance measurement as a distance measuring sensor.

Figure 21:
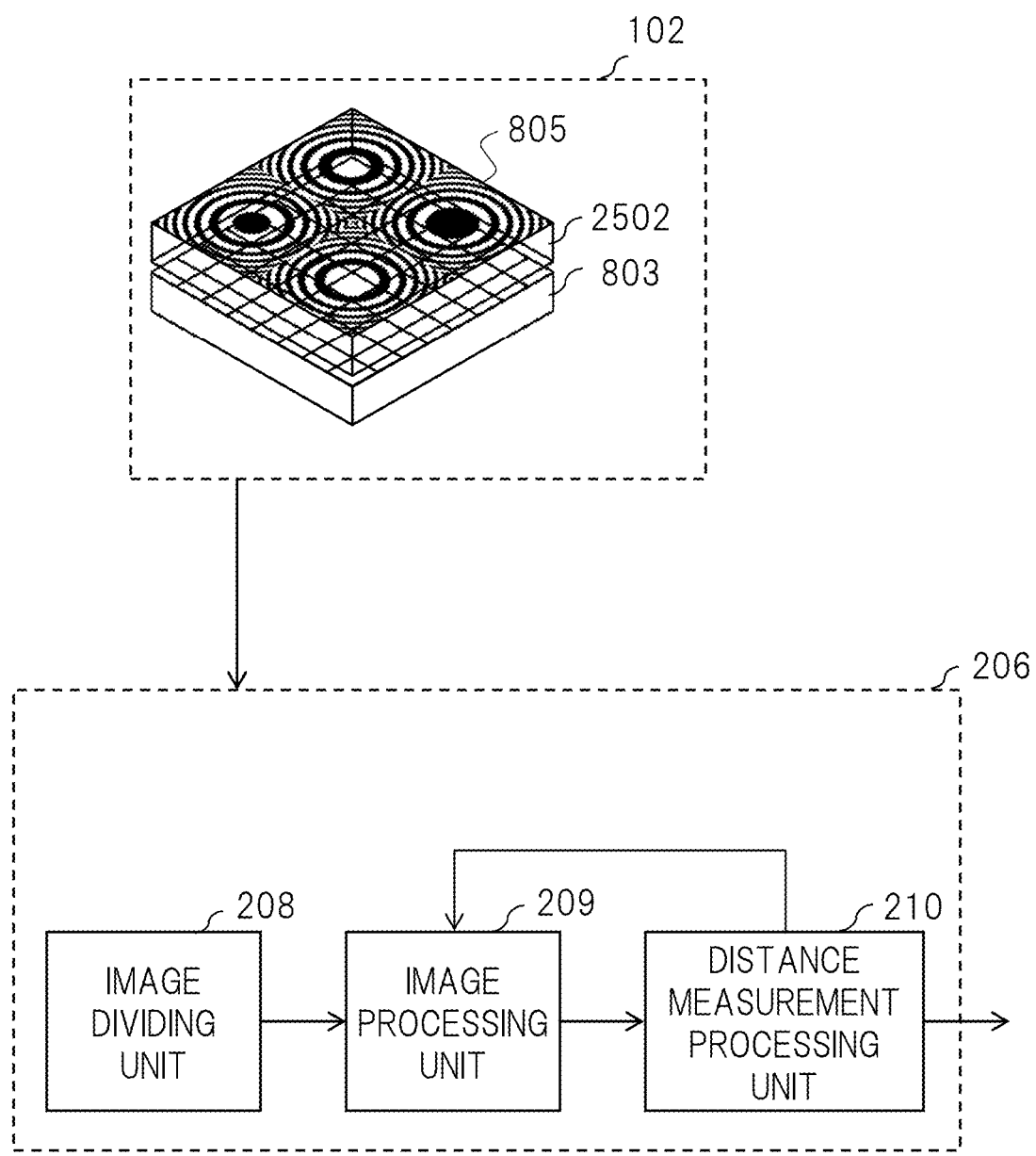
FIG. 21 is a view illustrating an embodiment of a gesture detecting unit in the image display apparatus.

In view of the principle described above, a configuration of the gesture detecting unit 206 according to the present embodiment will be described. FIG. 21 illustrates configurations of the distance measuring sensor unit 102 and the gesture detecting unit 206. The distance measuring sensor unit 102 includes a modulator 2502 and an image sensor 803. The modulator 2502 is configured from the pattern substrate 804 and the photographing pattern 805, which are illustrated in FIG. 5, for example.

Patterns of the modulator 2502 (the photographing pattern 805) are configured to two-dimensionally arrange a plurality of initial phase patterns like patterns when the initial phases Φ of FIG. 16 are respectively {0, π/2, π, and 3π/2}, for example. Namely, the photographing pattern 805 includes a plurality of patterns that are different from each other. The image dividing unit 208 divides an output of the image sensor 803 into areas based on the respective patterns of the modulator 2502, and in turn transmits them to the image processing unit 209 of the gesture detecting unit 206. Thus, the image dividing unit 208 of the gesture detecting unit 206 divides the image data obtained by being received by the image sensor 803 into the areas based on the respective patterns of the modulator 2502. Namely, the image dividing unit 208 of the gesture detecting unit 206 divides the image data in accordance with the plurality of patterns included in the photographing pattern 805.

In the example of FIG. 16, an output of the image sensor is divided into 2×2 areas. Since the subsequent processes of the image processing unit 209 are similar to those in FIG. 17 and FIG. 18, explanation thereof will be omitted. For example, the distance measurement processing unit 210 adjusts the developing pattern 1501, and the image processing unit 209 executes the calculation again, thereby obtaining the distance to the arbitrary position.

Thus, the modulator 2502 has the photographing pattern 805 provided on the light receiving surface of the image sensor 803 to modulate intensity of light. Namely, the gesture detecting unit 206 calculates the distance between the photographing pattern 805 and the point 2401 as described above, thereby it is possible to calculate the distance. As described above, the gesture detecting unit 206 restores the image by the calculation based on the second pattern in a divided image unit, and obtains the image for detecting gesture of the user. Note that the gesture detecting unit 206 does not restore the image in the divided image unit, but may collectively restore the image by means of a known calculation technique.

Figure 22:
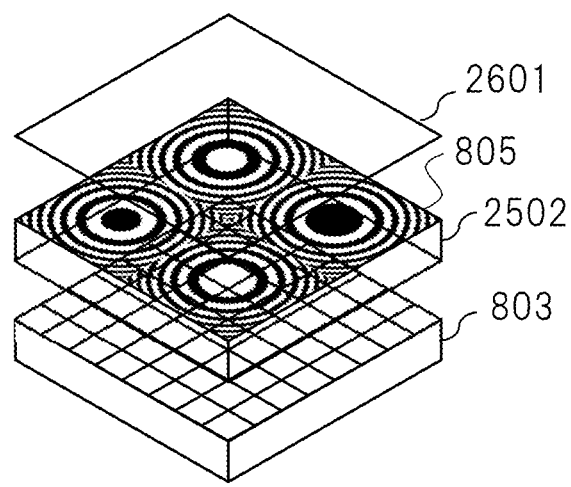
FIG. 22 is a view illustrating an embodiment of a distance measuring sensor unit.
Figure 23:
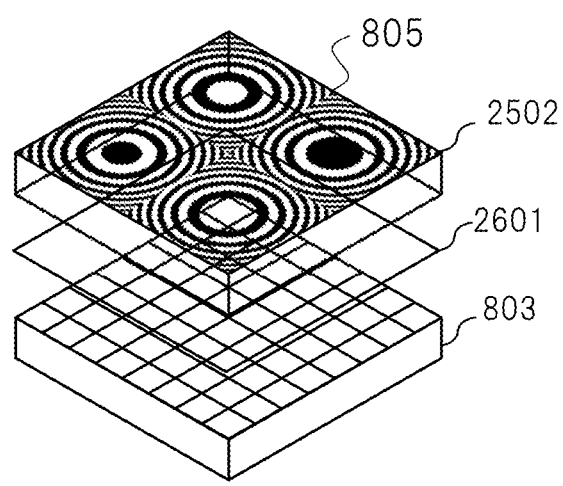
FIG. 23 is a view illustrating another embodiment of the distance measuring sensor unit.

In the present embodiment, near infrared light is utilized as a light source that is installed in the image display apparatus 101A. By irradiating the near infrared light to the target object, it becomes possible to measure the distance even in a dark room. In order to block unnecessary visible light, infrared light reflected by the photographic subject is transmitted to the distance measuring sensor, and an infrared transmitting filter or a bandpass filter for blocking visible light is installed, for example. FIG. 22 and FIG. 23 illustrate installation examples of the infrared transmitting filter.

FIG. 22 is a view in which the modulator 2502 is installed on the image sensor 803 and an infrared transmitting filter 2601 is installed thereon. FIG. 23 is a view in which the infrared transmitting filter 2601 is installed next to the image sensor 803 and the modulator 2502 is installed thereon. By installing this filter, it is possible to block unnecessary light, and this makes it possible to receive only infrared ray reflected light from the target object.

Figure 24:
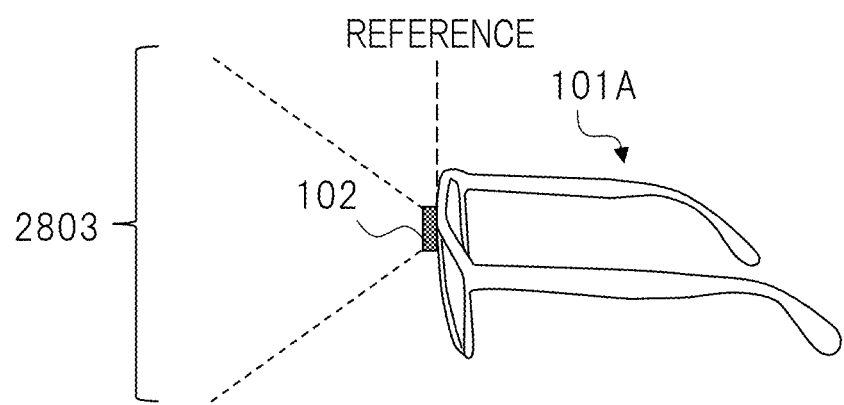
FIG. 24 is a view illustrating a schematic view of the image display apparatus.

Next, a method of shifting a gesture recognition area in order to improve usability of a gesture operation in the head mounted image display apparatus, for example, by setting a position at which the gesture operation is carried out outside a visual field range of the user so as to realize a more natural operation will be described. FIG. 24 illustrates an example in which the distance measuring sensor unit 102 is installed at a central portion of the pair of eyeglasses so as to be parallel to the image display unit as illustrated in FIG. 1.

Figure 25:
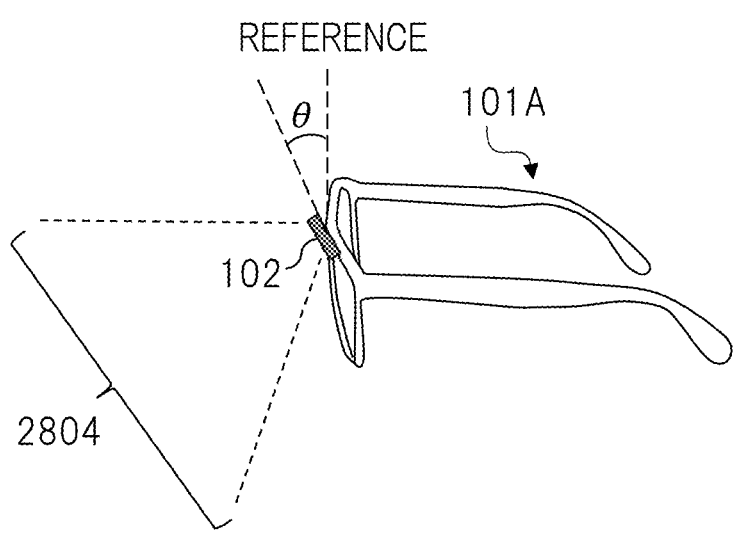
FIG. 25 is a view illustrating a schematic view of the image display apparatus.

At this time, a visual field of the distance measuring sensor, that is, the gesture recognition area is defined as an area indicated by a reference numeral "2803". FIG. 25 illustrates an example in which the distance measuring sensor unit 102 is installed so as to be diagonally inclined by an installation angle θ from a reference position in order to shift the gesture recognition area. In this case, the gesture recognition area becomes an area indicated by a reference numeral "2804", and the gesture recognition area illustrated in FIG. 24 becomes an area obtained by shifting it by the angle θ.

As described above, the modulator 2502 of the distance measuring sensor unit 102 has the photographing pattern 805 that includes the plurality of patterns that are different from each other, and modulates intensity of light. The gesture detecting unit 206 divides the image data obtained by receiving the light transmitted through the modulator 2502 by the image sensor 803 in a divided unit; restores the image by the calculation based on the developing pattern 1501 corresponding to the photographing pattern 805; and obtains the image for detecting gesture of the user. This makes it possible to obtain the image of the object in the outside world without using the lens for forming an image. Therefore, it is possible to reduce a load on a user when the user wears the apparatus. Namely, it becomes possible to realize a small image display apparatus that can recognize gesture in the optimal gesture recognition area.

Second Embodiment

Subsequently, a second embodiment will be described. The present embodiment is different from the first embodiment in a configuration and an installing method of a distance measuring sensor unit 102. Compared with the first embodiment, it is indicated that a further small image display apparatus 101 can be realized.

Figure 26:
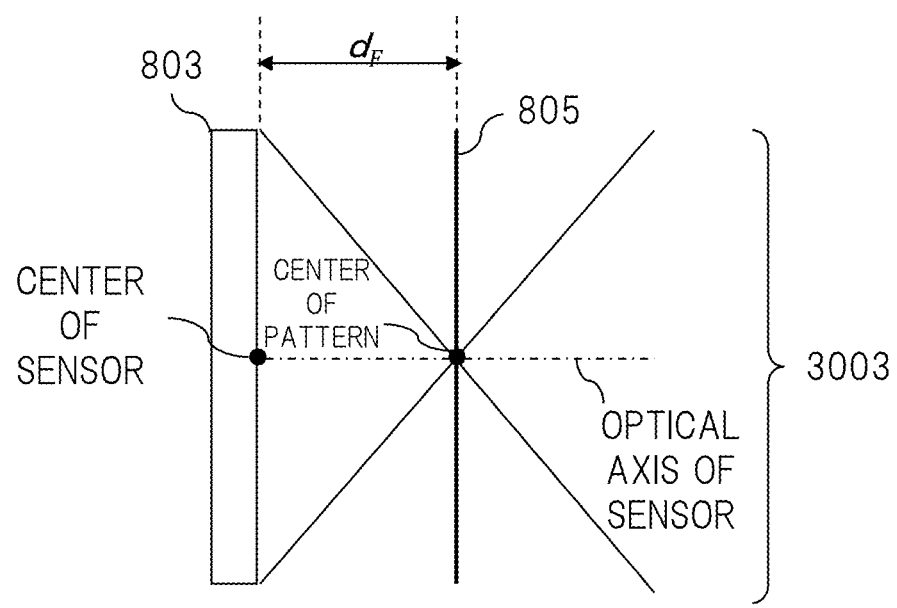
FIG. 26 is a view illustrating a schematic view of a positional relationship between an image sensor and a modulator in a distance measuring sensor unit.

FIG. 26 illustrates a basic configuration of the distance measuring sensor unit 102. First, a center of an effective area of an image sensor 803 is defined as a sensor center (image sensor center) A normal vector with respect to an image sensor surface at the sensor center is defined as a sensor optical axis. A center of a photographing pattern 805 is defined as a pattern center. The image sensor 803 and the photographing pattern 805 are installed so that they are parallel to each other and the sensor optical axis matches the pattern center. A distance therebetween is set to $d_F$.

Figure 27:
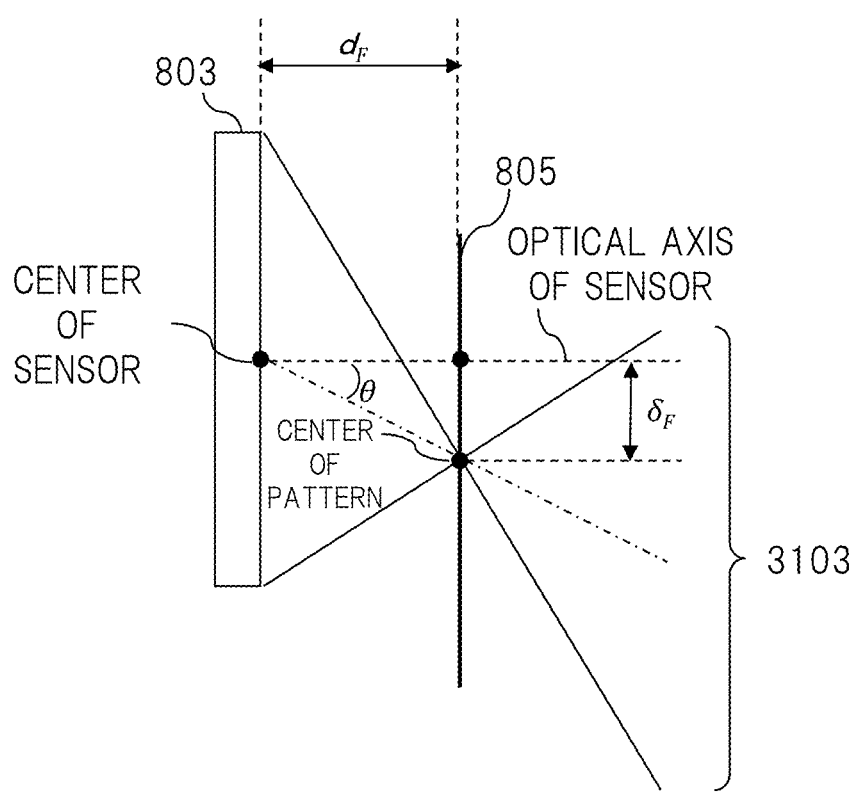
FIG. 27 is a view illustrating an embodiment of a positional relationship between an image sensor and a modulator in a distance measuring sensor unit.

At this time, a visual field of a distance measuring sensor, that is, a gesture recognition area becomes an area 3003 indicated by a straight line that passes through an end of the image sensor 803 and the pattern center. FIG. 27 illustrates a configuration of the distance measuring sensor according to the present embodiment in a case where this is a basic configuration. The photographing pattern 805 is installed at a position obtained by shifting the pattern center from the sensor optical axis by a shift angle θ. Here, a shift amount $δ_F$ can be expressed by $δ_F = d_F \tan θ$ (Formula (13)).

At this time, the gesture recognition area becomes an area 3103 indicated by a straight line that passes through an end of the image sensor 803 and the pattern center. Thus, compared with FIG. 26, it is possible to shift a center of the gesture recognition area by $δ_F$, and this makes it possible to reduce protrusion of a distance measuring sensor portion in a case where the sensor is diagonally installed.

Figure 28:
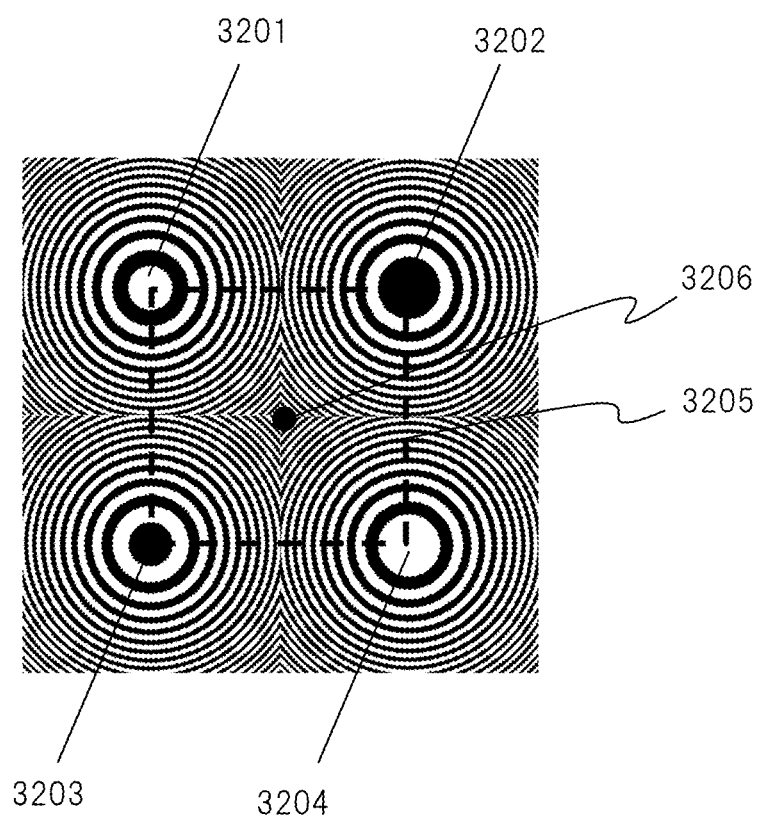
FIG. 28 is a view illustrating a pattern center of the modulator.

Here, a photographing pattern center will be described. FIG. 28 illustrates one example of a photographing pattern. As illustrated in FIG. 16, the photographing pattern is configured so that a plurality of initial phase patterns is two-dimensionally arranged. Centers of concentric circle patterns are respectively indicated by reference numerals 3201, 3202, 3203, and 3204. A point that becomes the center of gravity of a shape obtained by connecting the centers of the concentric circle patterns 3205, 3205 is indicated by a reference numeral 3206, and this point 3206 becomes the photographing pattern center.

Figure 29:
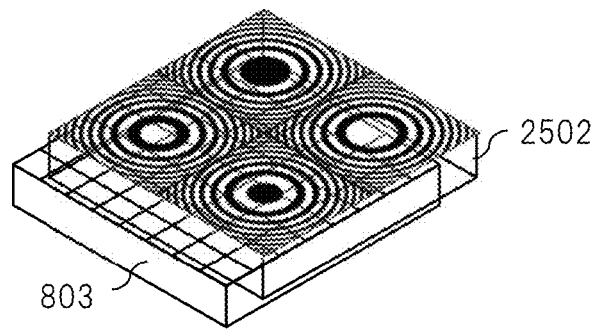
FIG. 29 is a view illustrating an embodiment of the modulator.
Figure 30:
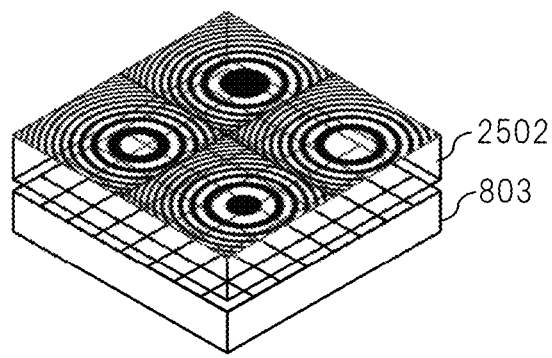
FIG. 30 is a view illustrating another embodiment of the modulator.

An example of a shifting method of the photographing pattern will be described with reference to FIG. 29 and FIG. 30. In case of FIG. 29, a modulator 2502 itself is shifted with respect to the image sensor 803 and is installed so that the photographing pattern center is shifted as described above. On the other hand, in case of FIG. 30, a position of the modulator 2502 itself is not changed, and only the photographing pattern is shifted. In any case, the similar effect can be obtained by shift of the photographing pattern as described above.

Further, by shifting the photographing pattern center in this manner, an image processing unit 209 executes a process to shift an image segmenting position at the time of development processing in accordance with the shift amount and segment an image.

According to the configuration described above, compared with a case where the distance measuring sensor is diagonally installed in the head mounted image display apparatus illustrated in the first embodiment, it becomes possible to realize a small image display apparatus. Further, as described above, the image display apparatus 101A can realize a more natural operation by shifting the position of the photographing pattern 805 and setting the position at which a user carries out a gesture operation to be outside a visual field range of the user. As a result, the image display apparatus 101A can improve usability of the gesture operation.

Third Embodiment

The present embodiment is different from the first embodiment in that a position of a modulator 2502 or a position of a photographing pattern 805 of the modulator 2502 is dynamically shifted. An example of a head mounted image display apparatus 101 is illustrated. For example, it is illustrated that usability of a user is improved by dynamically shifting a gesture recognition area so that the user is allowed to carry out a natural gesture depending upon a posture state such as an upright position or a sitting position.

Figure 31:
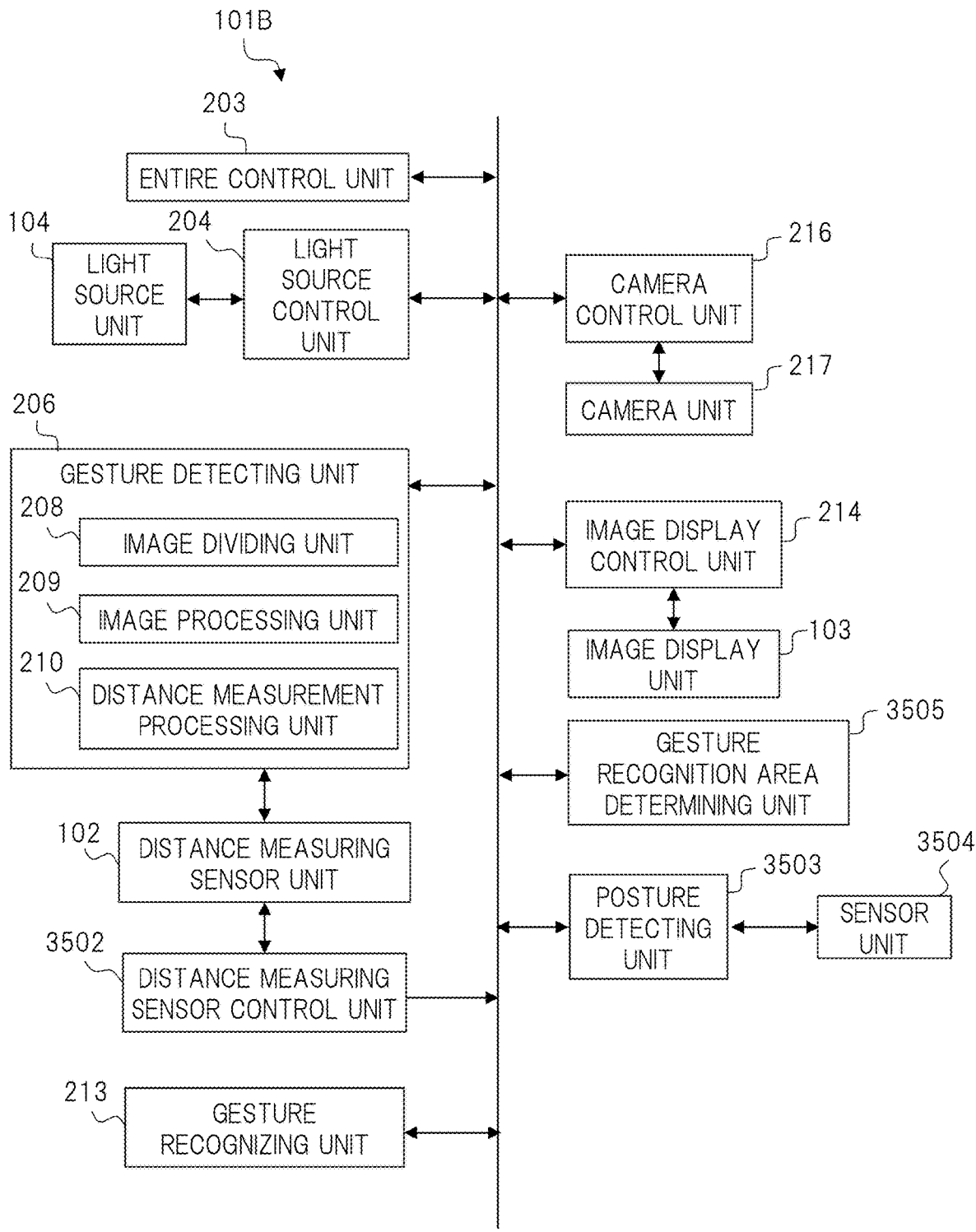
FIG. 31 is a view illustrating a functional configuration of an image display apparatus according to a third embodiment.

FIG. 31 is a view illustrating a functional configuration of an image display apparatus 101B according to a third embodiment. A basic configuration thereof is similar to that illustrated in FIG. 2. The image display apparatus 101B further includes a sensor unit 3504, a posture detecting unit 3503 (or a posture specifying unit) configured to detect posture of the user on the basis of information obtained by the sensor unit 3504, a gesture recognition area determining unit 3505, and a distance measuring sensor control unit 3502 (a modulator control unit or liquid crystal display control unit).

Here, the sensor unit 3504 is a gyro sensor or a nine-axle sensor, for example, and is a part for obtaining information indicating a state of the user. By installing the head mounted image display apparatus 101B, for example, information on angular velocity, acceleration, or terrestrial magnetism is obtained. However, the sensor unit 3504 may be any sensor so long as the state of the user is obtained. The sensor unit 3504 transmits sensor information to the posture detecting unit 3503.

The posture detecting unit 3503 is a part for obtaining sensor information from the sensor unit 3504 and detecting a posture of the user on the basis of the sensor information. The posture detecting unit 3503 is realized by a CPU or the like, for example. The posture detecting unit 3503 transmits a detection result to the distance measuring sensor control unit 3502.

The gesture recognition area determining unit 3505 is a part for determining a suitable gesture recognition area in accordance with the posture detected by the posture detecting unit 3503. The gesture recognition area determining unit 3505 is realized by a CPU or the like. The gesture recognition area determining unit 3505 obtains the detection result from the posture detecting unit 3503, and determines the gesture recognition area on the basis of the obtained result. When the gesture recognition area is determined, the gesture recognition area determining unit 3505 transmits a signal indicating a shift instruction of a modulator 2502 in a distance measuring sensor unit 102 or a photographing pattern 805 to a distance measuring sensor control unit 3502 on the basis of the determination.

The distance measuring sensor control unit 3502 is a part for shifting the position of the modulator 2502 included in the distance measuring sensor unit 102 or the photographing pattern 805. The distance measuring sensor control unit 3502 is a part for shifting the position of the modulator 2502 in the distance measuring sensor unit 102 or the photographing pattern 805 on the basis of an instruction signal obtained from the gesture recognition area determining unit 3505. The distance measuring sensor control unit 3502 is realized by a CPU or the like. When the instruction signal is obtained from the gesture recognition area determining unit 3505, the distance measuring sensor control unit 3502 shifts the modulator 2502 in the distance measuring sensor unit 102 or the photographing pattern 805 on the basis of the instruction signal.

Figure 32:
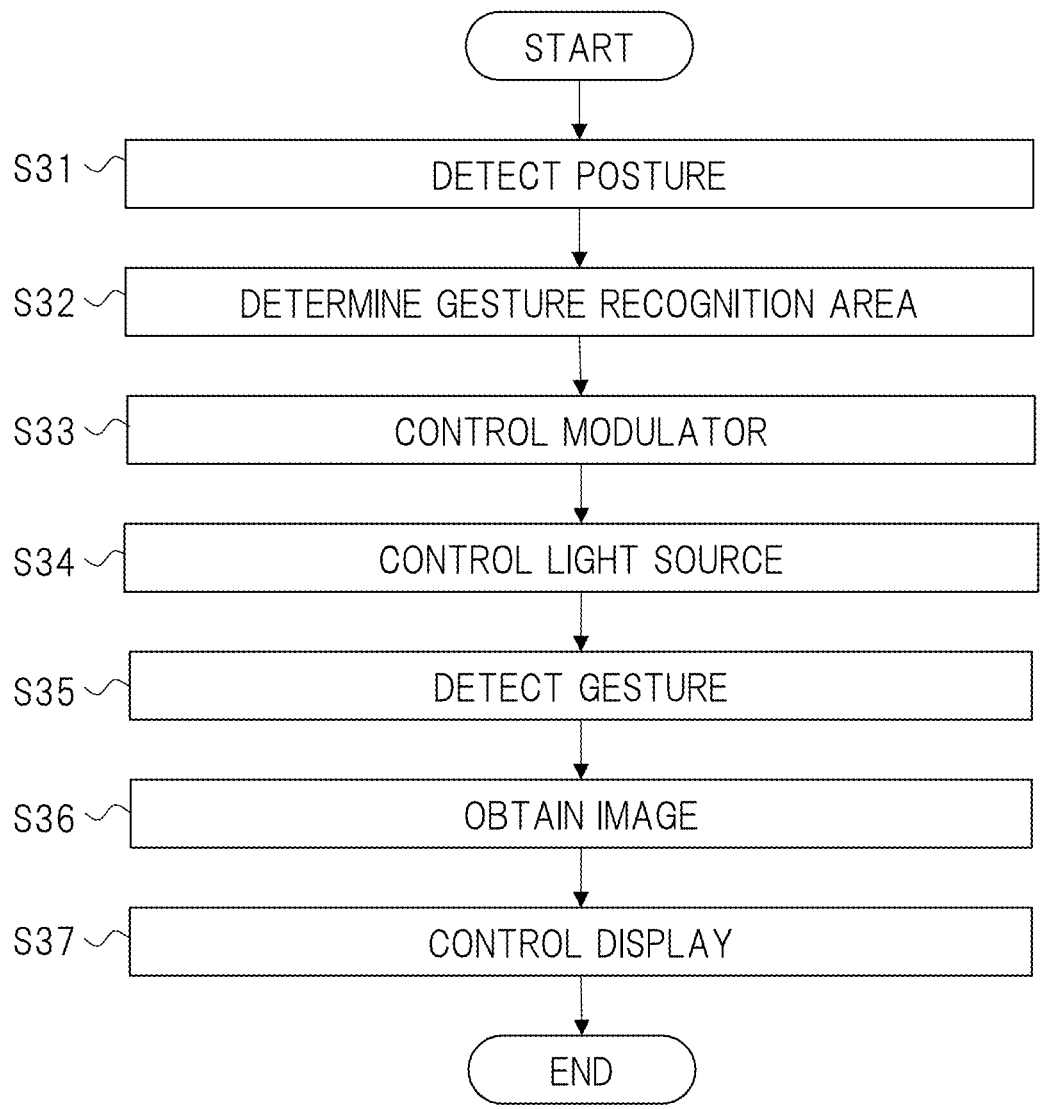
FIG. 32 is a view illustrating a processing flow according to the third embodiment.

A processing flow of the image display apparatus 101B illustrated in FIG. 31 (a processing flow according to the third embodiment) will be described with reference to FIG. 32. At Step S31, the posture detecting unit 3503 detects a posture of the user such as an upright position, a sitting position, a supine position, or a lateral position, for example, by using user information obtained by the sensor unit 3504. Next, at Step S32, the gesture recognition area determining unit 3505 determines a suitable gesture recognition area based on the detected posture. At Step S33, the distance measuring sensor control unit 3502 executes a control (modulator control) of a position of the modulator 2502 or a position of the photographing pattern 805 of the modulator 2502, which corresponds to the gesture recognition area. The subsequent processes at Steps S34 to S37 are respectively similar to those in FIG. 3.

Here, the example in which the gesture recognition area is determined in accordance with the posture has been described. As another example, the image display apparatus 101B may include input means (or a setting unit) via which the user designates a gesture recognition area (or a shift amount). The gesture recognition area may be designated in accordance with a hand by which the user carries out gesture (right hand or left hand), or the gesture recognition area may be designated in accordance with an application used by the user.

By designation of the area, at least one of a shift direction or an angle can be designated. Since the gesture recognition area can be set flexibly in this manner, it is possible to realize a natural gesture operation in accordance with usage environment of the user, and this makes it possible to improve usability thereof.

Next, a shift example of the photographing pattern 805 of the modulator 2502 will be described with reference to FIG. 33 and FIG. 34. These are drawings when the distance measuring sensor unit 102 installed in the image display apparatus 101B is viewed from a side of the image display apparatus 101B.

Figure 33:
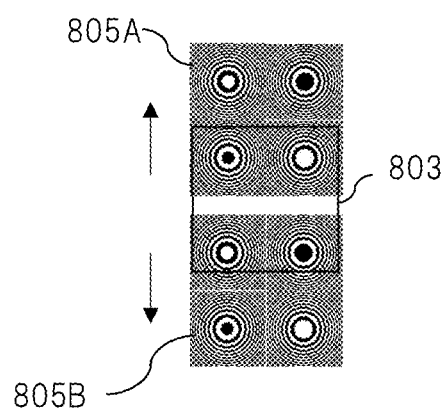
FIG. 33 is a view illustrating an embodiment in which a position of a modulator is changed dynamically.

In the example of FIG. 33, with respect to an image sensor 803, the modulator 2502 is shifted to a position in an upper direction or a position in a lower direction in FIG. 33. Along with this, the photographing pattern 805 is shifted to a position in the upper direction or the lower direction. The photographing pattern 805 shifted in the upper direction becomes a photographing pattern 805A. Further, the photographing pattern 805 shifted in the lower direction becomes a photographing pattern 805B.

For example, in a case where the user is at an upright position and wants to carry out a gesture operation at an upper side, the modulator 2502 is shifted to a position in the upper direction. In a case where the user is in a sitting position and it is assumed that the user is sitting on a chair and carries out a gesture operation on a desk, for example, it is good usability for the user when the gesture recognition area is shifted downward from a front face of the user. Therefore, the photographing pattern 805 of the modulator 2502 is shifted to a lower position. These are one example of the upright position and the sitting position. By shifting the position of the modulator 2502 so as to become a natural gesture operation in accordance with a posture of the user, it is possible to dynamically change the gesture recognition area.

Figure 34:
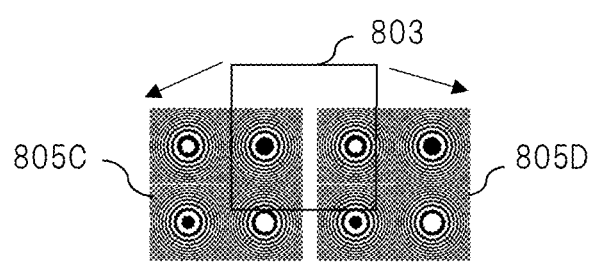
FIG. 34 is a view illustrating another embodiment in which the position of the modulator is changed dynamically.

In the example of FIG. 34, with respect to the image sensor 803, the photographing pattern 805 of the modulator 2502 is shifted to a position diagonally lower left in FIG. 34, or the photographing pattern 805 of the modulator 2502 is shifted to a position diagonally lower right in FIG. 34. For example, in a case where a gesture operation is carried out by the left hand, the modulator 2502 is shifted to the position diagonally lower left in FIG. 34, and the photographing pattern 805 is thereby shifted (a photographing pattern 805C). In a case where a gesture operation is carried out by the right hand, the modulator 2502 is shifted to the position diagonally lower right in FIG. 34, and the photographing pattern 805 is thereby shifted (a photographing pattern 805D). By shifting the position of the modulator 2502 so as to become a natural gesture operation in accordance with the hand by which the user carries out gesture in this manner, it is possible to dynamically change the gesture recognition area.

Here, the method of shifting the position of the modulator 2502 may be a method of mechanically shifting the modulator 2502, or may be a method of electrically shifting only the pattern. However, in a case where the modulator 2502 is shifted mechanically, a mechanism for moving the modulator 2502 is required, and there is a possibility that this causes an increase in a size of the apparatus.

Figure 35:
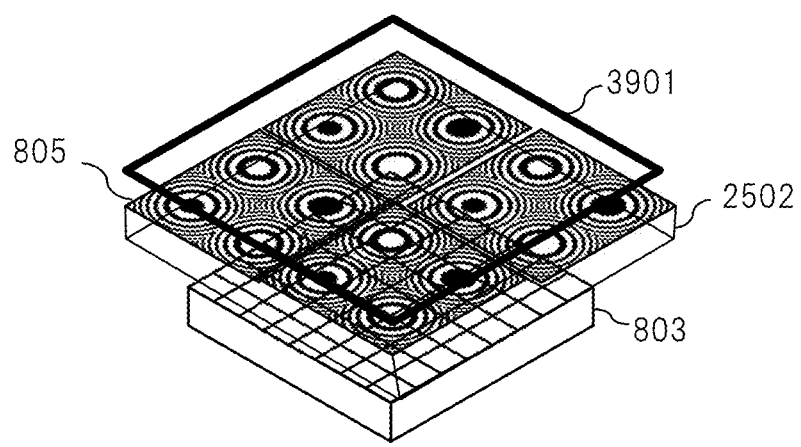
FIG. 35 is a view illustrating a schematic view of a structure of an image sensor.

Therefore, a method of electrically shifting only a pattern inexpensively will be described. FIG. 35 illustrates a configuration of the image sensor 803. A plurality of photographing patterns 805 is realized on the modulator 2502. This may be ones obtained by adhering a film that is realized by printing or the like. A liquid crystal display 3901 is arranged thereon. As illustrated in FIGS. 36($a$) and 36($b$), in this liquid crystal display, a portion through which light is transmitted is indicated by white, and a portion in which light is blocked is indicated by black. By switching the liquid crystal display 3901, it becomes possible to display the photographing pattern of the position corresponding to the portion through which light is transmitted as illustrated in FIGS. 37($a$) and 37($b$) when the liquid crystal display 3901 is combined with the modulator 2502. This makes it possible to dynamically shift the photographing pattern of the modulator 2502.

In this case, the distance measuring sensor control unit 3502 defines a portion in which light is blocked on the basis of a detection result by the posture detecting unit 3503, and controls the liquid crystal display 3901 of the distance measuring sensor unit 102. Further, the distance measuring sensor control unit 3502 notifies the gesture detecting unit 206 of the blocked portion. The gesture detecting unit 206 specifies a photographing pattern of the portion through which light is transmitted, which is specified by the blocked portion, and generates a developing pattern corresponding to the photographing pattern.

According to the configuration described above, the image display apparatus 101B changes the position of the photographing pattern 805 in accordance with the posture of the user, whereby it is possible to adjust an area where the user is expected to carry out gesture. Namely, the image display apparatus 101B dynamically shifts the gesture recognition area, for example, in accordance with a posture situation of the user such as the upright position or the sitting position or the hand by which the gesture is carried out, whereby it is possible to improve usability of the user.

Fourth Embodiment

An embodiment of a structure of a distance measuring sensor used in a head mounted image display apparatus 101 according to the present invention is illustrated to indicate that enlargement of a visual field is realized.

The present embodiment is different from the first embodiment to the third embodiment in that a structure of the distance measuring sensor illustrated in the first embodiment to the third embodiment is modified.

Figure 38:
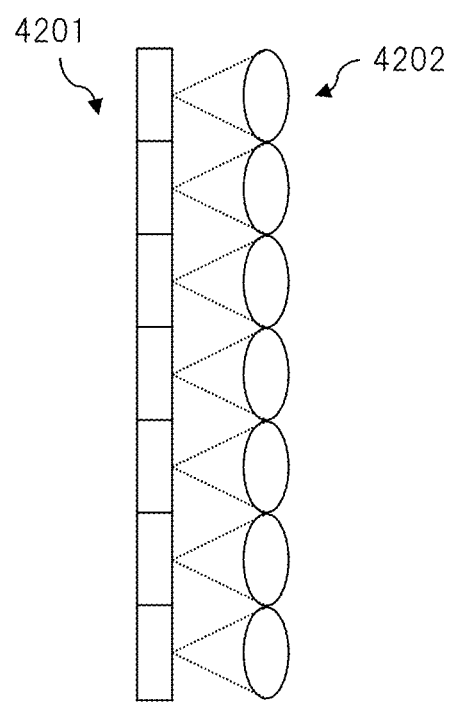
FIG. 38 is a view illustrating a relationship between a structure and an optical axis of an image sensor.
Figure 39:
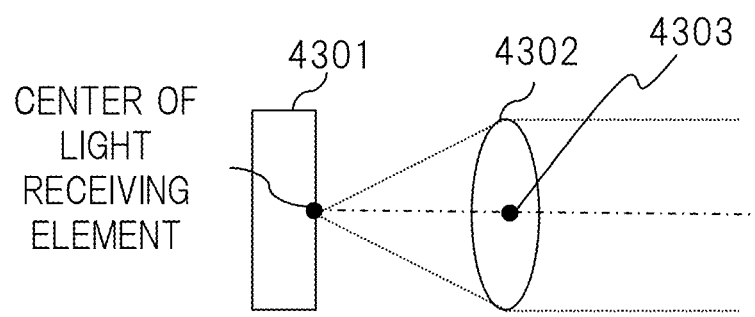
FIG. 39 is a view illustrating the relationship between the structure and the optical axis of the image sensor.

FIG. 38 illustrates a basic structure of an image sensor 803 in a distance measuring sensor unit 102. As illustrated in FIG. 38, the image sensor 803 includes a light receiving element array 4201 and a microlens array 4202. FIG. 39 illustrates a part of this. FIG. 39 is a view illustrating a part of the light receiving element array 4201 and the microlens array 4202. FIG. 39 illustrates a light receiving element 4301 corresponding to one pixel of the light receiving element array 4201 and one microlens 4302 of the microlens array 4202. Note that a center of the microlens 4302 is referred to as a "center 4303". This microlens 4302 has a role of focusing light on the light receiving element 4301. FIG. 39 illustrates a state when a parallel light flux enters the microlens 4302. Next, a chief ray incident angle characteristic (CRA characteristic: Chief Ray Angle characteristic) will be described with reference to FIG. 40 and FIG. 41.

Figure 40:
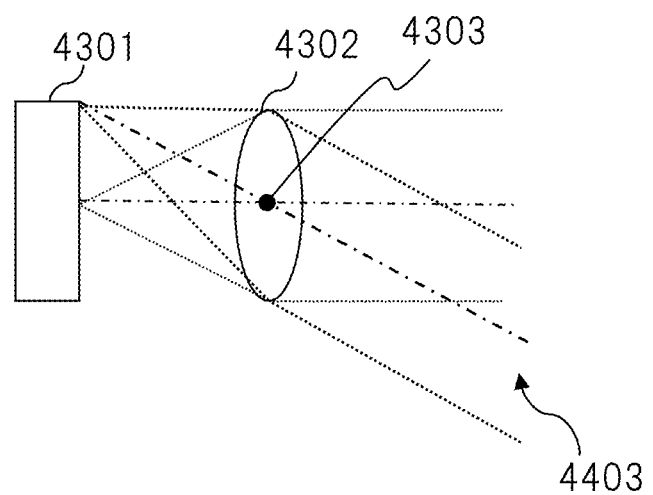
FIG. 40 is a view illustrating the relationship between the structure and the optical axis of the image sensor.
Figure 41:
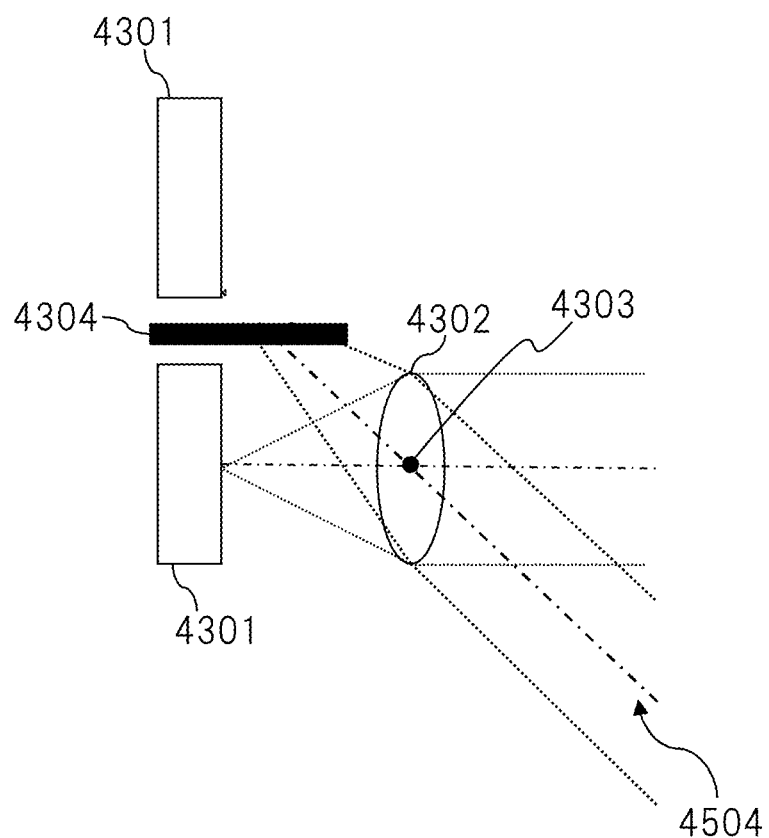
FIG. 41 is a view illustrating the relationship between the structure and the optical axis of the image sensor.

FIG. 40 is a view illustrating an example of reception of light at a standard incident angle. As illustrated in FIG. 40, a parallel light flux 4403 can be focused on the light receiving element 4301 and thereby received. FIG. 41 is a view illustrating an example of reception of light in a case where an incident angle is large. As illustrated in FIG. 41, a parallel light flux 4504 when the incident angle becomes large is not focused on the light receiving element 4301, and cannot thereby be received. Further, an electrode 4304 for extracting electric charge from the light receiving element 4301 is arranged between the light receiving element 4301 and the adjacent light receiving element 4301. Therefore, the focused light is blocked by the electrode 4304, whereby the focused light cannot be received by the adjacent light receiving element 4301.

In other words, in the present embodiment, the angle of the parallel light flux 4403 illustrated in FIG. 40 becomes a limit angle at which light can be received, and this influences a receivable angle range of the image sensor, that is, the CRA characteristic.

Figure 42:
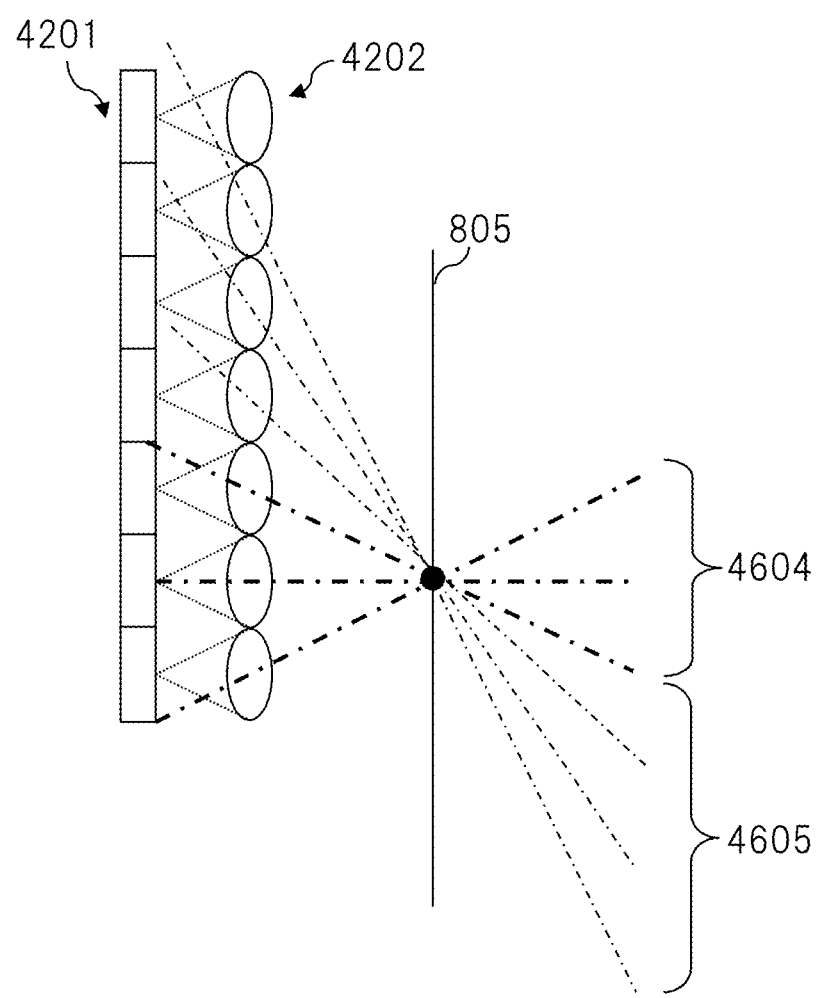
FIG. 42 is a view illustrating a visual field based on a relationship between the image sensor and photographing pattern.

In view of the foregoing, a gesture recognition range when the modulator 2502 is shifted as described in the second embodiment or the third embodiment will be described with reference to FIG. 42. FIG. 42 is a view for explaining the gesture recognition range when the modulator 2502 is shifted. Rays incident from an area 4604 illustrated in FIG. 42 becomes a range in which the rays can be received by the light receiving element array 4201. Rays incident from an area 4605 cannot be received on the light receiving element array 4201. Therefore, depending upon the CRA characteristic, even though a visual field direction can be shifted, the visual field is limited.

Figure 43:
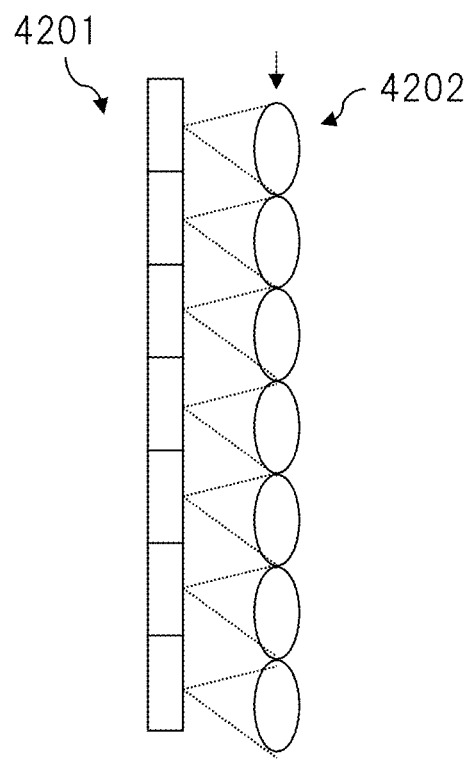
FIG. 43 is a view illustrating the structure of the image sensor according to the embodiment.
Figure 44:
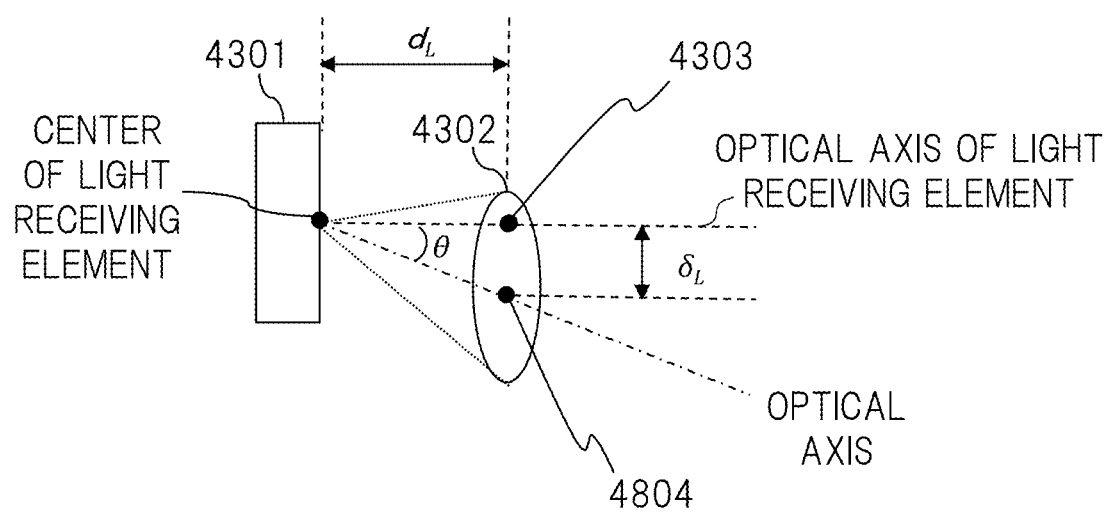
FIG. 44 is a view illustrating the relationship between the structure and the optical axis of the image sensor according to the embodiment.

An arrangement example of the light receiving element array 4201 and the microlens array 4202 according to the present embodiment will be described with reference to FIG. 43. FIG. 43 is a view illustrating an arrangement example of the light receiving element array 4201 and the microlens array 4202. This becomes a structure in which the whole microlens array 4202 is shifted evenly. Here, FIG. 44 illustrates a part of the light receiving element array 4201 and the microlens array 4202. FIG. 44 is a view illustrating a part of the light receiving element array 4201 and the microlens array 4202.

A center 4804 of a microlens is shifted by a shift angle θ from the center 4303 of the microlens illustrated in FIG. 39 (that is, the center before shift). This shift amount is the same as the shift angle in the modulator 2502. Namely, when a normal vector with respect to an image sensor surface at the center of each light receiving element is set to a light receiving element optical axis, they are installed so that the light receiving element array 4201 becomes parallel to the microlens array 4202, and a microlens center is at a position evenly shifted from the light receiving element optical axis in the same direction as a direction in which the pattern center is shifted from a center of the image sensor. Further, a shift amount of the center of the microlens becomes $\delta_L$. When a distance between the image sensor and the microlens array is set to $d_L$, it can be expressed by $\delta_L = d_L \tan \theta$ (Formula (14)). Thus, they are installed so that the microlens center is at a position evenly shifted from the light receiving element optical axis by the angle θ.

Figure 45:
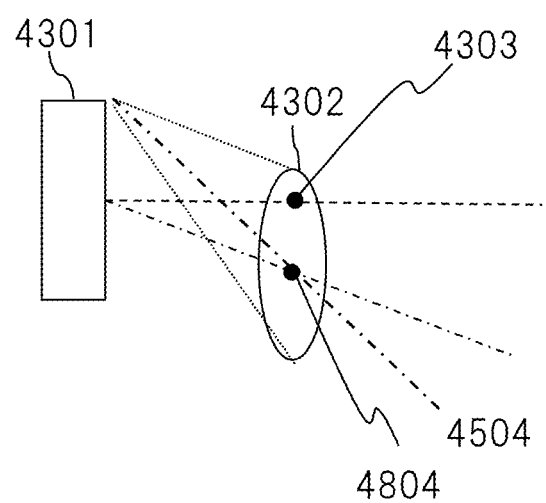
FIG. 45 is a view illustrating the structure of the image sensor according to the embodiment.

As a result, as illustrated in FIG. 45, it becomes possible to receive a light flux obtained by setting the parallel light flux 4504 that cannot be received in FIG. 42 to an optical axis.

According to the configuration and the method described above, it becomes possible to enlarge the gesture recognition range. It does not become a problem in a case where an image sensor with a high CRA characteristic is utilized. However, the present system allows to secure an optimal visual field.

The present invention is not limited to the image display apparatus 101A or the image display apparatus 101B described in the first embodiment to the fourth embodiment described above. A function by the display unit and a function to calculate image data may be divided by a communicating unit.

Figure 46:
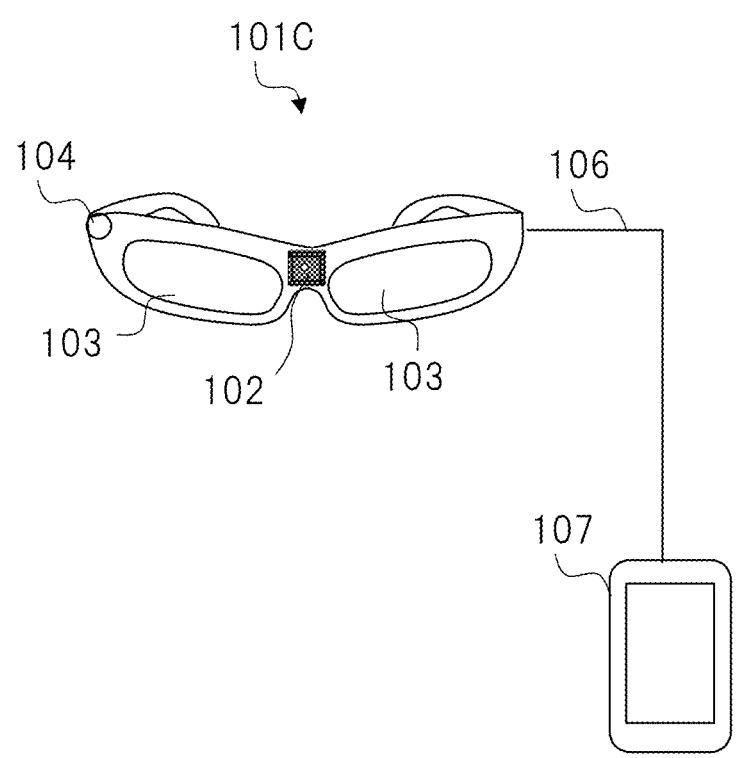
FIG. 46 is a view illustrating a schematic view of ahead mounted image display apparatus according to another embodiment.

For example, as illustrated in FIG. 46, an image display apparatus 101C may be configured so that an apparatus including the distance measuring sensor unit 102, the image display unit 103, and the light source unit 104 is connected to a calculating unit 107 having functions to calculate image data (for example, a terminal device such as a smartphone) by a wired or wireless communicating unit 106.

In this case, image data obtained by the distance measuring sensor unit 102 may be compressed and transmitted to the calculating unit 107.

Note that the present invention is not limited to the embodiments described above, and various modifications are contained. For example, the embodiments described above have been explained in detail for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment.

Further, a part of the configuration of each of the embodiments can be added to the other configuration, deleted, or replaced thereby.

Further, a part or all of the respective configuration described above, the functions, processing units, and processing means may be realized by hardware that is designed by an integrated circuit, for example. Further, the respective configuration described above and the functions may be realized by software so that a processor interprets programs realizing the respective functions and execute the interpreted programs. Information on programs, tables, and files, which realize the respective functions, can be placed in a recording device such as a memory, a hard disk, or an SSD (Solid State Drive), or a recording medium such as an IC card, an SD card, or a DVD.

Further, control lines and information lines are illustrated so long as they are thought to be necessary for explanation. All of the control lines and the information line are not necessarily illustrated on a product. In fact, it may be considered that almost all of the components are connected to each other.

INDUSTRIAL APPLICABILITY

The present invention can be utilized for an apparatus that displays an image.

REFERENCE SINGS LIST 101, 101A, 101B . . . image display apparatus, 102 . . . distance measuring sensor unit, 103 . . . image display unit, 104 . . . light source unit, 106 . . . communicating unit, 107 . . . calculating unit, 203 . . . entire control unit, 204 . . . light source control unit, 206 . . . gesture detecting unit, 208 . . . image dividing unit, 209 . . . image processing unit, 210 . . . distance measurement processing unit, 213 . . . gesture recognizing unit, 214 . . . image display control unit, 216 . . . camera control unit, 217 . . . camera unit, 2502 . . . modulator, 3502 . . . distance measuring sensor control unit, 3503 . . . posture detecting unit, 3504 . . . sensor unit, 4201 . . . light receiving element array, 4202 . . . microlens array, 4301 . . . light receiving element, 4302 . . . microlens.

The invention claimed is:

1. An image display apparatus capable of being mounted on a user, the image display apparatus comprising:
an image sensor configured to capture an optical image, convert the captured optical image into an image data and output the converted image data;
a modulator provided on a light receiving surface of the image sensor, the modulator having a first pattern that includes a plurality of patterns different from each other, the modulator being configured to modulate intensity of light;
a gesture detector configured to divide image data obtained by receiving light transmitted through the modulator by the image sensor in accordance with the plurality of patterns included in the first pattern, the gesture detector being configured to restore an image by calculation based on a second pattern corresponding to the first pattern, the gesture detector being configured to obtain an image for detecting gesture of the user;
a gesture recognizer configured to specify the gesture of the user by using the image obtained by the gesture detector, the gesture recognizer being configured to recognize an instruction corresponding to the specified gesture; and
an image display configured to display a result based on the instruction recognized by the gesture recognizer,
a posture detector configured to specify a posture state of the user; and
a modulator controller configured to shift the first pattern on a basis of the posture state specified by the posture detector,
wherein a gesture recognition area is shifted on a basis of the specified posture state by the modulator controller, the gesture recognition area is a capture range of the optical image of the image sensor.

2. The image display apparatus according to claim 1, wherein the modulator controller shifts the gesture recognition area in a direction in accordance with the specified posture state.

3. The image display apparatus according to claim 1, wherein when a center of an effective area of the image sensor is defined as an image sensor center, a normal vector with respect to an image sensor surface at the image sensor center is defined as a sensor optical axis, and a center of the first pattern in the modulator is defined as a pattern center, then the modulator and the image sensor are installed so that the image sensor becomes parallel to the first pattern and the pattern center becomes a position shifted from the sensor optical axis.

4. The image display apparatus according to claim 1, wherein the image sensor includes a plurality of light receiving elements in an array and a plurality of microlenses in an array, and
wherein when a normal vector with respect to the image sensor surface at a center of each of the light receiving elements in the image sensor is defined as a light receiving element optical axis and a center of the microlens is defined as a microlens center, an array of the light receiving elements in the image sensor becomes parallel to an array of the microlenses, and the array of the light receiving elements and the array of the microlenses are installed so that the microlens center is at a position evenly shifted from the light receiving element optical axis in a same direction as a direction in which the pattern center is shifted from a center of the image sensor.

5. The image display apparatus according to claim 1, further comprising:
a light source configured to irradiate an infrared ray to the user;
a light source controller configured to control the light source; and
an infrared transmitting filter configured to transmit the infrared light irradiated from the light source to cut visible light.

6. An image display apparatus capable of being mounted on a head of a user, the image display apparatus comprising:
an image sensor configured to convert an optical image into an image signal and output the converted image signal, the optical image being captured by a plurality of light receiving elements arranged in an array on an imaging surface;
a modulator provided on a light receiving surface of the image sensor, the modulator having a first pattern that includes a plurality of patterns different from each other, the modulator being configured to modulate intensity of light;
a gesture detector configured to divide image data obtained by receiving light transmitted through the modulator by the image sensor in accordance with the plurality of patterns included in the first pattern, the gesture detector being configured to restore an image by calculation based on a second pattern corresponding to the first pattern, the gesture detector being configured to obtain an image for detecting gesture of the user;

a gesture recognizer configured to specify the gesture of the user by using the image obtained by the gesture detector, the gesture recognizer being configured to recognize an instruction corresponding to the specified gesture; and an image display configured to display a result based on the instruction recognized by the gesture recognizer, wherein when a center of an effective area of the image sensor is defined as an image sensor center, a normal vector with respect to an image sensor surface at the image sensor center is defined as a sensor optical axis, and a center of the first pattern in the modulator is defined as a pattern center, then the modulator and the image sensor are installed in a position where the image sensor becomes parallel to the first pattern and the pattern center becomes a position shifted from the sensor optical axis, and wherein a gesture recognition area is shifted in a predetermined direction by installing the modulator and the image sensor in the position, the gesture recognition area is a capture range of the optical image of the image sensor.

7. The image display apparatus according to claim 6, further comprising
a setting interface configured to receive setting of a shift amount of the first pattern,
wherein a position of the first pattern is shifted in accordance with the shift amount set by the setting interface.

8. The image display apparatus according to claim 6,
wherein in a case where a distance between the image sensor and the first pattern is set to d and the pattern center is shifted from the sensor optical axis by a shift angle $\theta$, a shift amount of the pattern center is $d \times \tan \theta$.

9. The image display apparatus according to claim 8,
wherein the image sensor includes a plurality of microlenses in an array, and
wherein when a normal vector with respect to the image sensor surface at a center of each of the light receiving elements in the image sensor is defined as a light receiving element optical axis and a center of the microlens is defined as a microlens center, the array of the light receiving elements and the array of the microlenses are installed so that the microlens center is at a position evenly shifted from the light receiving element optical axis by the shift angle $\theta$.

10. The image display apparatus according to claim 6,
wherein patterns included in the first pattern and the second pattern are composed of a plurality of concentric circles, pitches fining down so as to be inversely proportional to radii from a center toward an outside with respect to a reference coordinate that becomes the center of each of the concentric circles.

11. The image display apparatus according to claim 6,
wherein the image sensor includes a plurality of microlenses in an array, and
wherein when a normal vector with respect to the image sensor surface at a center of each of the light receiving elements in the image sensor is defined as a light receiving element optical axis and a center of the microlens is defined as a microlens center, an array of the light receiving elements in the image sensor becomes parallel to an array of the microlenses, and the array of the light receiving elements and the array of the microlenses are installed so that the microlens center is at a position evenly shifted from the light receiving element optical axis in a same direction as a direction in which the pattern center is shifted from a center of the image sensor.

12. The image display apparatus according to claim 6, further comprising:
a light source configured to irradiate an infrared ray to the user;
a light source controller configured to control the light source; and
an infrared transmitting filter configured to transmit the infrared light irradiated from the light source to cut visible light.

13. An image display method executed by an image display apparatus that can be mounted on a head of a user, the image display apparatus comprising:
an image sensor configured to convert an optical image into an image signal and output the converted image signal, the optical image being captured by a plurality of light receiving elements arranged in an array on an imaging surface; and
a modulator provided on a light receiving surface of the image sensor, the modulator having a first pattern that includes a plurality of patterns different from each other, the modulator being configured to modulate intensity of light,
the image display method comprising:
a gesture detecting step of dividing image data obtained by receiving light transmitted through the modulator by the image sensor in accordance with the plurality of patterns included in the first pattern, restoring an image by calculation based on a second pattern corresponding to the first pattern, and obtaining an image for detecting gesture of the user;
a gesture recognizing step of specifying the gesture of the user by using the image obtained in the gesture detecting step, and recognizing an instruction corresponding to the specified gesture; and
an image displaying step of displaying a result based on the instruction recognized in the gesture recognizing step,
wherein when a center of an effective area of the image sensor is defined as an image sensor center, a normal vector with respect to an image sensor surface at the image sensor center is defined as a sensor optical axis, and a center of the first pattern in the modulator is defined as a pattern center, then the modulator and the image sensor are installed in a position where the image sensor becomes parallel to the first pattern and the pattern center becomes a position shifted from the sensor optical axis, and
wherein a gesture recognition area is shifted in a predetermined direction by installing the modulator and the image sensor in the position, the gesture recognition area is a capture range of the optical image of the image sensor.

14. An image display method according to claim 13,
wherein in a case where a distance between the image sensor and the first pattern is set to d and the pattern center is shifted from the sensor optical axis by a shift angle $\theta$, a shift amount of the pattern center is $d \times \tan \theta$.

* * * * *